(12) United States Patent
Lee et al.

(10) Patent No.: US 12,455,467 B2
(45) Date of Patent: Oct. 28, 2025

(54) VIEWING ANGLE CONTROLLING FILM AND DISPLAY DEVICE COMPRISING THE SAME

(71) Applicant: LG DISPLAY CO., LTD., Seoul (KR)

(72) Inventors: SuJeong Lee, Seoul (KR); SungHee Kim, Paju-si (KR); Jaehyun Park, Seongnam-si (KR)

(73) Assignee: LG Display Co., Ltd (KR)

( * ) Notice: Subject to any disclaimer, the term of this patent is extended or adjusted under 35 U.S.C. 154(b) by 650 days.

(21) Appl. No.: 17/866,047

(22) Filed: Jul. 15, 2022

(65) Prior Publication Data

US 2023/0081704 A1     Mar. 16, 2023

(30) Foreign Application Priority Data

Aug. 26, 2021 (KR) .................. 10-2021-0113528

(51) Int. Cl.
*G02F 1/13* (2006.01)
*G02F 1/167* (2019.01)
*G02F 1/1676* (2019.01)
*G02F 1/1675* (2019.01)
*H10K 59/50* (2023.01)

(52) U.S. Cl.
CPC ............ *G02F 1/1323* (2013.01); *G02F 1/167* (2013.01); *G02F 1/1676* (2019.01); *G02F 2001/1678* (2013.01); *H10K 59/50* (2023.02)

(58) Field of Classification Search
CPC ...... G02F 1/1323; G02F 1/1676; G02F 1/167; G02F 1/094; G02F 1/133626; G02F 2001/1678; G02B 5/223
See application file for complete search history.

(56) References Cited

U.S. PATENT DOCUMENTS

2012/0118198 A1* 5/2012 Zhou ............... C09D 11/037
568/672
2022/0342273 A1* 10/2022 Son ................. G02F 1/1323

FOREIGN PATENT DOCUMENTS

| KR | 10-2005-0000702 A | 1/2005 |
|---|---|---|
| KR | 10-2018-0004879 A | 1/2018 |
| KR | 10-2018-0041768 A | 4/2018 |
| KR | 20210019587 A | 2/2021 |
| KR | 20210042610 A | 4/2021 |

(Continued)

OTHER PUBLICATIONS

Office Action in Korean Appln. No. 10-2021-0113528, mailed on Feb. 3, 2025, 18 pages (with English translation).

(Continued)

*Primary Examiner* — Angela M. Medich
(74) *Attorney, Agent, or Firm* — Fish & Richardson P.C.

(57) ABSTRACT

A display device includes a viewing angle controlling film includes a first base material, a first electrode disposed on the first base material; a transparent resin layer which is disposed on the first electrode and has a plurality of accommodating units; a second electrode disposed on the transparent resin layer; and a second base material disposed on the second electrode, and an ink including a charged hollow carbon black and a solvent is accommodated in each of the plurality of accommodating units, thus the viewing angle controlling film has an excellent dispersion stability and the settling of the particles due to the gravity is suppressed to improve a driving characteristic.

20 Claims, 17 Drawing Sheets

(56) References Cited

FOREIGN PATENT DOCUMENTS

| | | |
|---|---|---|
| KR | 20210042627 A | 4/2021 |
| KR | 20210043155 A | 4/2021 |
| KR | 20210098553 A | 8/2021 |
| WO | WO 2021/054656 A1 | 3/2021 |

OTHER PUBLICATIONS

Office Action in Chinese Appln. No. 202210821102.4, mailed on Apr. 23, 2025, 12 pages (with English translation).

* cited by examiner

VIEWING ANGLE CONTROLLING FILM AND DISPLAY DEVICE COMPRISING THE SAME

CROSS-REFERENCE TO RELATED APPLICATION

This application claims the priority of Korean Patent Application No. 10-2021-0113528 filed on Aug. 26, 2021, which is hereby incorporated by reference in its entirety.

BACKGROUND

Field of the Disclosure

The present disclosure relates to a viewing angle controlling film and a display device including the same, and more particularly, to a viewing angle controlling film with a high switching speed of a wide viewing angle mode and a narrow viewing angle mode, excellent performance and driving stability and a display device including the same.

Description of the Background

In accordance with the increased demand for personal privacy protection, various related products are being developed in various fields. Among products that guarantee the personal privacy, a demand for a viewing angle control device which is attached to various displays such as a cellular phone, a tablet PC, a monitor, or a display for a vehicle to block lateral light transmission and narrows a viewing angle is increasing year by year.

A film type viewing angle controlling film in which a light transmissive area through which light is transmitted and a light blocking area which blocks light in a specific direction are alternately formed has been used. The viewing angle controlling film includes a transmissive area and a light blocking area which is disposed between the transmissive areas to block or absorb the light. The light blocking area includes a black pigment. Light having an incident angle which is equal to or larger than a predetermined angle, among light incident from the lower portion is absorbed or blocked by light blocking areas which are repeatedly formed so that the light cannot pass through the viewing angle controlling film. By doing this, at a viewing angle which is equal to or larger than a predetermined angle, light transmittance is significantly reduced so that the screen is not visible. However, the viewing angle controlling film of the related art has inconvenience in that if the film is not removed, the viewing angle is not restored to the existing state so that the film needs to be removed.

Recently, in order to solve this inconvenience, a viewing angle controlling film which selectively switches a wide viewing angle mode and a narrow viewing angle mode according to an electrical signal applied from the outside without attaching/detaching the film is being developed.

However, the switchable viewing angle controlling film has problems in that a dispersibility of black particles in the ink is lowered and a driving characteristic is degraded due to the particle settling, and the switching speed of the wide viewing angle mode and the narrow viewing angle mode is slow. Further, when a high specific gravity solvent is used or an anti-settling agent is additionally added to improve the particle settling, the viscosity of the ink is increased, so that the driving speed becomes slow.

SUMMARY

Accordingly, the present disclosure is to provide a viewing angle controlling film which reduces a density difference between a solvent and particles to have excellent dispersion stability and suppresses the particle settling to improve a driving characteristic.

The present disclosure is also to provide a viewing angle controlling film which has an excellent bistability and uses an ink having a low viscosity to have an excellent switching speed of a wide viewing angle mode and a narrow viewing angle mode.

Further, the present disclosure is to provide a viewing angle controlling film having excellent performance and driving stability.

The present disclosure is not limited to the above-mentioned, and other features, which are not mentioned above, can be clearly understood by those skilled in the art from the following descriptions.

According to an aspect of the present disclosure, a viewing angle controlling film includes a first base material, a first electrode disposed on the first base material; a transparent resin layer which is disposed on the first electrode and has a plurality of accommodating units; a second electrode disposed on the transparent resin layer; and a second base material disposed on the second electrode, and an ink including a charged hollow carbon black and a solvent is accommodated in each of the plurality of accommodating units.

According to an aspect of the present disclosure, a display device includes a display panel; and a viewing angle controlling film which is disposed above or below the display panel.

Other detailed matters of the exemplary aspects are included in the detailed description and the drawings.

According to the present disclosure, in a viewing angle controlling film, an ink including a charged hollow carbon black and a solvent is accommodated in each of a plurality of accommodating unit. A density difference between the charged hollow carbon black and the solvent is significantly reduced to suppress the particle settling. Therefore, according to the present disclosure, the viewing angle controlling film has an excellent dispersion stability and the settling of the particles due to the gravity is suppressed to improve a driving characteristic.

According to the present disclosure, even though the viewing angle controlling film includes a hollow carbon black with a less content, a shielding rate in a narrow viewing angle mode is excellent and the viscosity of the ink is lowered to improve the driving characteristic and the driving speed.

Therefore, the display device including the viewing angle controlling film according to the present disclosure has an excellent switching speed of the wide viewing angle mode and the narrow viewing angle mode and an excellent driving performance.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
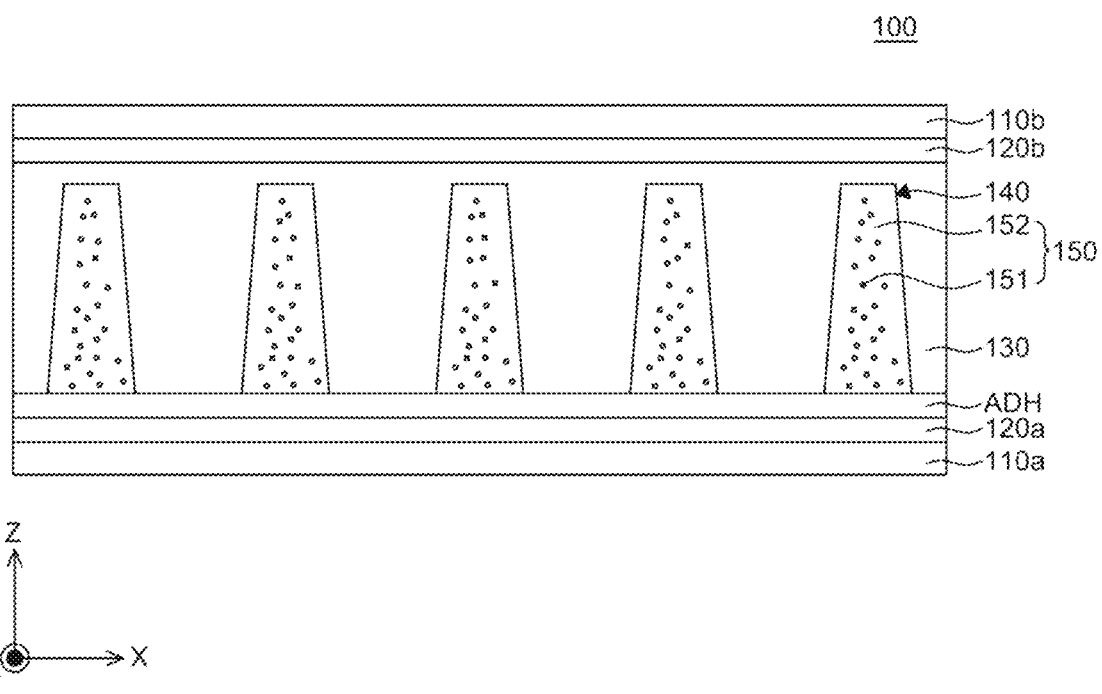
FIG. 1 is a schematic cross-sectional view of a viewing angle controlling film according to an exemplary aspect of the present disclosure.

Advantages and characteristics of the present disclosure and a method of achieving the advantages and characteristics will be clear by referring to exemplary aspects described below in detail together with the accompanying drawings. However, the present disclosure is not limited to the exemplary aspects disclosed herein but will be implemented in various forms. The exemplary aspects are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary aspects of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various aspects of the present disclosure can be partially or entirely adhered to or combined with each other and can be interlocked and operated in technically various ways, and the aspects can be carried out independently of or in association with each other.

Unless otherwise stated herein, the density is a value measured at 15 to 20° C.

Unless otherwise stated herein, an average particle size refers to a particle size D50 corresponding to 50% of cumulative particle size distribution.

Hereinafter, a viewing angle controlling film and a display device according to exemplary aspects of the present disclosure will be described in detail with reference to accompanying drawings.

Figure 2:
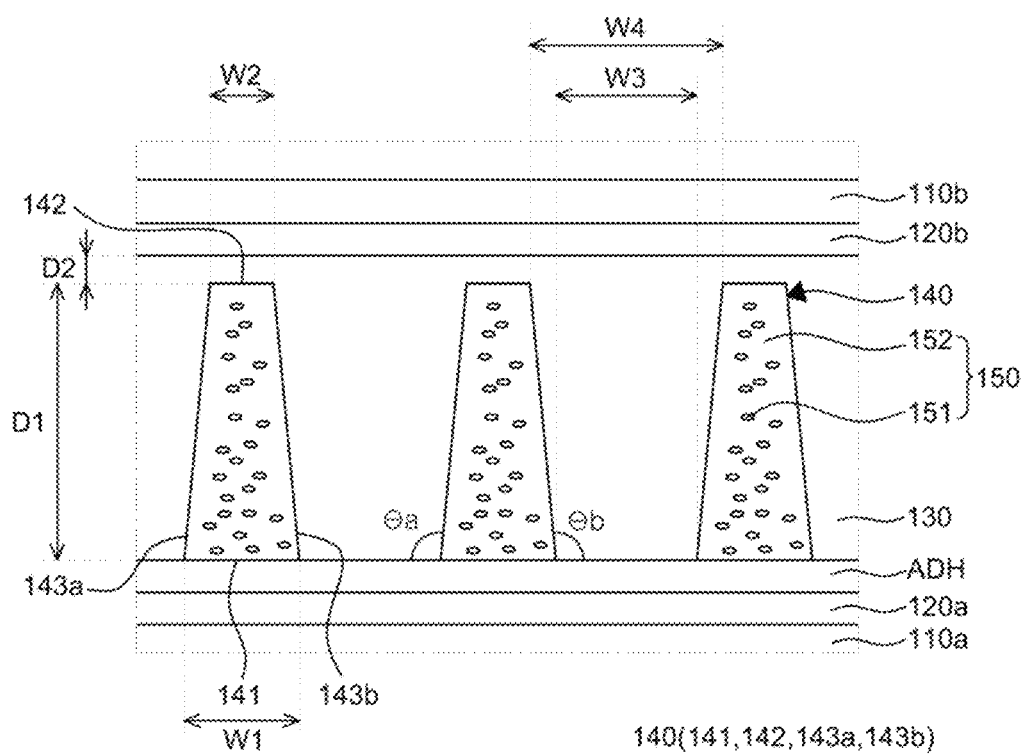
FIG. 2 is an enlarged view of a viewing angle controlling film according to an exemplary aspect of the present disclosure.

FIG. 1 is a schematic cross-sectional view of a viewing angle controlling film according to an exemplary aspect of the present disclosure. FIG. 2 is an enlarged view of a viewing angle controlling film according to an exemplary aspect of the present disclosure.

The viewing angle controlling film according to the exemplary aspect of the present disclosure is applied to the organic light emitting display device or the liquid crystal display device. When an electric field is not formed, the viewing angle controlling film operates in a wide viewing angle mode to transmit light incident from the lower portion at various angles so that an image displayed on the display device is observed not only from the front surface, but also from the side surface. In contrast, when the electric field is not formed, the viewing angle controlling film absorbs light having an incident angle which is equal to or larger than a predetermined angle, among light incident from the lower portion. Accordingly, the viewing angle controlling film operates in a narrow viewing angle mode to allow the user to view an image displayed on the display device from the front surface of the display device or only within a predetermined narrow angle range.

First, referring to FIGS. 1 and 2, a viewing angle controlling film 100 according to an exemplary aspect of the present disclosure includes a first base member 110a, a first electrode 120a, an adhesive layer ADH, a transparent resin layer 130, a plurality of accommodating units 140, an ink 150, a second electrode 120b, and a second base member 110b.

The first base member 110a protects the first electrode 120a and the transparent resin layer 130. The first base member 110a may be formed of a transparent insulating material. For example, the first base member 110a may be formed to include one or more polymers selected from cycloolefin polymer, cycloolefin copolymer, triacetyl cellulose, polycarbonate, polyethylene terephthalate, and polyimide. Desirably, for example, the first base member 110a may be formed of a material selected from cycloolefin polymer and cycleolefin copolymer. In this case, an optical characteristic of the viewing angle controlling film is more excellent.

For example, a thickness of the first base member 110a may be 50 µm to 200 µm or 100 µm to 150 µm, but is not limited thereto.

The first electrode 120a is disposed on the first base member 110a. The first electrode 120a may be formed of a transparent conductive material to transmit light incident from the lower portion. For example, the transparent conductive material may be one or more selected from indium-tin-oxide (ITO), indium-zinc-oxide (IZO), indium-tin-zinc oxide (ITZO), and aluminum zinc oxide (AZO), but is not limited thereto.

The first electrode 120a may be formed on a front surface of the first base member 110a and if necessary, may be selectively patterned to overlap the plurality of accommodating units 140.

For example, a thickness of the first electrode 120a may be 0.1 µm to 10 µm or 0.1 µm to 2 µm, or 0.1 µm to 0.5 µm, but is not limited thereto.

The transparent resin layer 130 is disposed on the first electrode 120a. The transparent resin layer 130 may be formed of a transparent insulating resin which transmits light incident from the lower portion of the viewing angle controlling film 100. For example, the transparent resin layer 130 may include one or more selected from acrylic resin, polycarbonate, polyethylene terephthalate, triacetyl cellulose resin, polyethylene, and polypropylene.

Specifically, for example, the transparent resin layer 130 may include the acrylic resin formed by curing a resin composition including an UV curable compound such as a urethane acrylate compound or an epoxy acrylate compound. Specifically, the acrylic resin formed from a urethane acrylate compound has advantage of excellent curability, high transparency, and excellent adhesion property. Specifically, for example, the transparent resin layer 130 may be formed by photopolymerizing a resin composition including the urethane acrylate compound, a photo initiator, and a release agent. At this time, in order to increase the curing speed and improve a physical property such as adhesiveness, two or more types of urethane acrylate based compounds having different molecular weights may be mixed to be used.

If the photo initiator is generally used to manufacture a transparent resin in the art, the photo initiator is not specifically limited. For example, as the photo initiator, diphenyl (2,4,6-trimethylbenzoyl) phosphine oxide or acyl phosphine oxide may be used, but is not limited thereto.

The transparent resin layer 130 may further include a surfactant. The surfactant may be one or more selected from tricresyl phosphate and tributyl phosphate. In order to drive the viewing angle controlling film 100, an electric field need to be formed by applying a voltage to the first electrode 120a and the second electrode 120b so that the surfactant is dispersed in the transparent resin layer 130 to easily form the electric field.

The transparent resin layer 130 may further include a release agent. The transparent resin layer 130 includes a plurality of accommodating units 140 which is formed by a physical processing method such as a master molding process, an imprinting process, or a photolithography process. The release agent may easily separate a structure for forming a pattern such as a mold for forming the plurality of accommodating units 140 from the transparent resin layer 130. For example, the release agent uses a silicon based, polyethylene based, or paraffin-based material which is generated used in the art without degrading the transparency.

For example, a thickness of the transparent resin layer 130 may be 80 µm to 200 µm, but is not limited thereto.

The transparent resin layer 130 includes a plurality of accommodating units 140. Each of the plurality of accommodating units 140 is a space for accommodating an ink 150 which absorbs light incident from the outside. The plurality of accommodating units 140 is grooves formed in the transparent resin layer 130 and is formed on the first electrode 120a so as to face the second electrode 120b.

Each of the plurality of accommodating units 140 is disposed to be spaced apart from each other with a predetermined interval along a first direction (an x axis direction) which is perpendicular to a thickness direction (a z axis direction) of the transparent resin layer 130.

Each of the plurality of accommodating units 140 extends along the second direction (y axis direction) which is perpendicular to the thickness direction (a z axis direction) and the first direction (an x axis direction). That is, each of the plurality of accommodating units 140 extends from any one corner of the first electrode 120a to the other corner which is parallel the one corner to be formed on the first electrode 120a with a stripe structure.

Each of the plurality of accommodating units 140 is configured by a lower surface 141, an upper surface 142, a first connection unit 143a, and a second connection unit 143b. Specifically, each of the plurality of accommodating units 140 includes the lower surface 141 facing the first electrode 120a and the upper surface 142 facing the lower surface 141. Further, each of the plurality of accommodating units 140 includes the first connection unit 143a which connects one end of the lower surface 141 and one end of the upper surface 142 corresponding thereto and the second connection unit 143b which connects the other end of the lower surface 141 and the other end of the upper surface 142 corresponding thereto.

Each of the plurality of accommodating units 140 may be formed such that a width is reduced from the first electrode 120a toward the second electrode 120b. That is, a width W1 of the lower surface 141 of each of the plurality of accommodating units 140 is larger than a width W2 of the upper surface 142. In the drawings, even though it is illustrated that a cross-sectional shape of each of the plurality of accommodating units 140 has a trapezoidal shape, it is just an example, but is not limited thereto.

The upper surface 142 of each of the plurality of accommodating unit 140 is spaced apart from the second electrode 120*b*. That is, each of the plurality of accommodating units 140 does not pass through the transparent resin layer 130 in the thickness direction (a z axis direction) of the transparent resin layer 130. When the plurality of accommodating units 140 is formed to have a hole structure which passes through the transparent resin layer 130, if a liquid ink 150 is filled in the accommodating unit 140, a problem such as leakage may be caused, which deteriorates the productivity and causes a defect. In order to suppress the problem during the process, the upper surface 142 of the plurality of accommodating units 140 is spaced apart from the second electrode 120*b* so as not to be in contact and the transparent resin layer 130 is present in the space therebetween.

The ink 150 includes a charged hollow carbon black 151 and a solvent 152. The charged hollow carbon black 151 may absorb light incident from the outside. The solvent 152 disperses the charged hollow carbon black 151 which is a solid in the plurality of accommodating units 140.

For example, the solvent 152 may be one or more selected from halocarbon solvents, isoparaffinic solvents, and ether solvents.

For example, the halocarbon solvent may be a fully or partially halogenated hydrocarbon. For example, the halocarbon solvent may include one or more selected from halocarbon 0.8, halocarbon 1.8, halocarbon 4.2 and halocarbon 6.3 of Halocarbon LLC. FC-72, FC-74, and FC-70 of 3M, FCL 1031 of Milo, and HT55 of Solvay.

For example, the isoparaffinic solvent may include one or more selected from Isopar G, Isopar L, Isopar C, Isopar E, Isopar M, and Isopar H of ExxonMobil Corporation, but is not limited thereto.

For example, the ether solvent may include one or more selected from diethylene glycol dimethyl ether, propylene glycol methyl ether, and propylene glycol methyl ether acetate, but is not limited thereto.

The solvent 152 has a different density and dielectric constant depending on the type and is appropriately selected in accordance with a demanded characteristic. Further, the solvent 152 uses a single material and if necessary, two or more materials may be mixed to control the density or the dielectric permittivity of the ink 150.

Further, as the solvent 152, a solvent having an ignition point of 60 degrees or lower may be desirably used in consideration of the process stability.

In the meantime, it is desirable to use the solvent 152 after removing moisture using a moisture remover. The moisture in the solvent 152 promotes aggregation between particles so that the viscosity of the ink 150 is increased. When the viscosity of the ink 150 is increased, a mobility of particles, that is, charged hollow carbon black 151 is lowered so that the driving characteristic is degraded and a switching speed of the wide viewing angle mode and the narrow viewing angle mode may be lowered. Therefore, it is desirable to use a moisture remover which is generally used in the art such as zeolite, magnesium hydroxide, and porous silica to remove as much moisture in the solvent 152 as possible.

Figure 3:
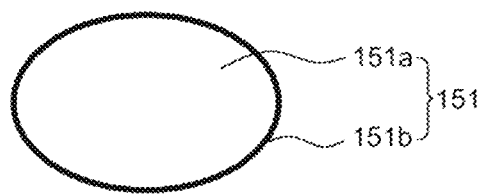
FIG. 3 is a schematic cross-sectional view of a hollow carbon black.

FIG. 3 is a schematic cross-sectional view of a charged hollow carbon black. Referring to FIG. 3, the charged hollow carbon black 151 includes a hollow portion 151*a* and a shell 151*b*. The hollow portion 151*a* is a core portion of the particle and is a hollow which is substantially empty. The shell 151*b* includes carbon black and is formed to enclose the hollow portion 151*a*. The shell 151*b* is formed to have a porous structure or a non-porous structure.

The charged hollow carbon black 151 includes the hollow portion 151*a* so that a density thereof is lower than that of a general carbon black particle which does not include the hollow portion 151*a*. Accordingly, the charged hollow carbon black 151 is not settled by the gravity and maintains a stably dispersed state in the ink 150.

The settling speed of the particle may be calculated by the following Equation 1.

$$v = \frac{2a^2(\rho_2 - \rho_1)g}{9\eta} \quad \text{[Equation 1]}$$

Here, v is a settling speed of a particle, a is a radius of particle, $p_2$ is a density of the particle, $p_1$ is a density of the particle, g is a gravitational acceleration, and n is a viscosity o the solvent.

As represented in Equation 1, the settling speed v of the particle is increased as a difference ($p_2-p_1$) between the particle and the solvent is larger. Therefore, in order to uniformly disperse the charged particles in the plurality of accommodating units 140 without settling the charged particles, the charged particles and solvent need to have substantially the same density.

Densities of the isoparaffinic solvent and the halocarbon solvent which are solvents generally used in the art are 0.6 g/cm³ to 1.2 g/cm³, but the density of the carbon black of the related art is 1.4 g/m³ which is higher than the density of the solvent. Accordingly, the ink of the related art has a problem in that it is difficult to uniformly disperse the carbon black due to the density difference of the carbon black and the solvent and the carbon black is settled due to the gravity. Moreover, a bistability of the viewing angle controlling film is deteriorated and there is a limitation to improve the driving speed and the characteristic.

The charged hollow carbon black 151 of the present disclosure includes a hollow portion 151*a* so that the density is lower than the carbon black of the related art. For example, the density of the charged hollow carbon black 151 may be 0.60 g/cm³ to 0.90 g/cm³ or 0.70 g/cm³ to 0.80 g/cm³. Accordingly, the density difference from the solvent is significantly reduced so that the dispersion stability of the particle is excellent the settling is suppressed. Accordingly, the charged hollow carbon black 151 is uniformly dispersed in the solvent 152 so that the uniformity of the ink 150 is significantly improved. Moreover, the bistability of the viewing angle controlling film 100 is improved, the driving characteristic is improved, and the switching speed of the wide viewing angle mode and the narrow viewing angle mode is excellent.

The density of the charged hollow carbon black 151 may vary depending on a size of the hollow portion 151a, that is, a volume %. For example, the volume % of the hollow portion 151a may be 50 vol. % to 90 vol. % or 70 vol. % to 90 vol. %. Within this range, the density difference from that of the solvent 152 is small and the effect of suppressing the particle settling is particularly excellent.

An BET surface area of the charged hollow carbon black 151 may be 500 m$^2$/g to 1500 m$^2$/g or 900 m$^2$/g to 1500 m$^2$/g. In this range, the density difference between the charged hollow carbon black 151 and the solvent 152 is reduced so that the particle settling may be suppressed.

An average particle size of the charged hollow carbon black 151 may be 100 nm to 500 nm. To be more desirably, the average particle size of the charged hollow carbon black 151 may be 140 nm to 250 nm or 140 nm to 180 nm. Within this range, the dispersion stability of the ink 150 is excellent and the settling speed is slow. When the average particle size is too small, the dispersion stability of the charged hollow carbon black 151 may be degraded due to the interaction between particles. Further, the particles are aggregated due to the interaction between particles so that the settling may be promoted. As represented in Equation 1, the settling speed v of the particle is increased as a radius a of the particle is increased. Accordingly, when the average particle size of the charged hollow carbon black 151 is too large, there may be a problem in that the charged hollow carbon black 151 is settled in the ink 150 due to the gravity.

The charged hollow carbon black 151 is charged with a positive charge or a negative charge. Accordingly, when a voltage is applied to the first electrode 120a and the second electrode 120b, the charged hollow carbon black 151 which is uniformly dispersed in the solvent 152 is aggregated in the vicinity of the first electrode 120a or the second electrode 120b by an electric field formed therebetween. A detailed description thereof will be provided below.

For example, the charged hollow carbon black 151 is charged with the negative charge. Specifically, the hollow carbon black 151 which is charged with negative charges may be a hollow carbon black having a surface modified with one or more functional groups selected from a carboxylate group (—COO$^-$), sulfonate group (—SO$_3^-$) and sulfate group (SO$_4^{2-}$). For example, the hollo carbon black modified with the carboxylate group is obtained by a simple process of adding the hollow carbon black into the nitric acid and/or sulfuric acid, reacting the hollow carbon black at a relatively low temperature of approximately 100° C., and then dispersing the hollow carbon black in the solvent 152. The charged hollow carbon black 151 obtained as described above has a high surface charge amount. The charged hollow carbon black 151 has a high surface charge amount to be more quickly move by the electric field and thus the bistability is improved and the driving characteristic and the stability of the viewing angle controlling film 100 may be improved.

For example, the charged hollow carbon black 151 is included in an amount of 0.1 wt. % to 5 wt. % based on a total weight of the ink 150. When the content of the charged hollow carbon black 151 is too small, the light absorption effect is degraded and the content is too much, the light transmittance in the wide viewing angle mode is degraded.

The ink 150 may further include a dispersant. A dispersant having a basic functional group may be used. For example, the dispersant may be polyisobutylene succinimide amine expressed by the following Formula 1.

[Formula 1]

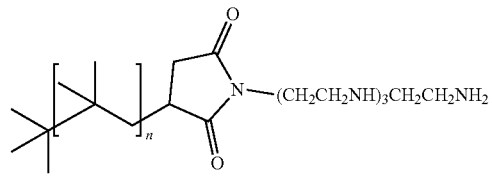

In Formula 1, n is an integer of 5 to 500.

An amine group of the dispersant expressed by Formula 1 reacts with a functional group bonded to the surface of the charged hollow carbon black 151. The dispersant expressed by Formula 1 is formed to be bonded to the surface of the charged hollow carbon black 151 to enclose the surface of the charged hollow carbon black 151. The dispersant expressed by Formula 1 has a long chain length so that the dispersant encloses the surface of the charged hollow carbon black 151 to function as a protective layer to suppress aggregation between particles. Further, the dispersant expressed by Formula 1 allows the negatively charged hollow carbon black 151 to stably maintain a charged state. By doing this, the repulsive force between particles is induced to minimize the aggregation between particles. Accordingly, the dispersion property of the charged hollow carbon black 151 is improved and the dispersion stability of the ink 150 is improved to improve the driving characteristic of the viewing angle controlling film 100.

For example, the dispersant may be included in an amount of 0.1 wt % to 5 wt % based on the total weight of the ink 150. When the content of the dispersant is too small, the improvement effect of the dispersion stability may be insignificant. A molecular weight of the dispersant is large so that when the dispersant is excessively added, the dispersant may increase the viscosity of the ink 150. When the viscosity of the ink 150 is increased, the movement of the charged hollow carbon black 151 is not easy so that the driving characteristic of the viewing angle controlling film 100 may be degraded.

The ink 150 may further include a surfactant. For example, the surfactant may be a phosphate-based compound, but is not limited thereto. Specifically, for example, the surfactant may be selected from tricresyl phosphate and tributyl phosphate, but is not limited thereto. The surfactant increases the permittivity of the ink 150 to improve a response speed of the viewing angle controlling film 100.

The second electrode 120b is disposed on the transparent resin layer 130. The second electrode 120b is substantially the same as the above-described first electrode 120a except that it is disposed above the transparent resin layer 130. Further, the second base material 110b is disposed on the second electrode 120b. The second base material 110b is substantially the same as the above-described first base material 110a except that it is disposed on the second electrode 120b. Accordingly, a redundant description will be omitted.

An adhesive layer ADH is disposed between the transparent resin layer 130 and the first electrode 120a. For example, the viewing angle controlling film 100 is manufactured by manufacturing a first assembly configured by the first base material 110a and the first electrode 120a and manufacturing a second assembly configured by the second base material 110b, the second electrode 120b, and the transparent resin layer in which the ink 150 is accommodated in the plurality of accommodating units 140, and then bonding the first assembly and the second assembly. In this case, after injecting the ink 150 in the plurality of accommodating units 140, the first assembly and the second assembly are bonded using the adhesive layer ADH. However, it is not limited thereto so that the adhesive layer ADH may be disposed between the transparent resin layer 130 and the second electrode 120b or may be omitted according to the manufacturing process or the structure of the viewing angle controlling film 100.

For example, a thickness of the adhesive layer ADH may be 1 μm to 100 μm, but is not limited thereto.

For example, the adhesive layer ADH may be formed of a material selected from an optically clear adhesive (OCA), an optically clear resin (OCR), or a pressure sensitive adhesive (PSA), but is not limited thereto.

Hereinafter, a wide viewing angle mode and a narrow viewing angle mode will be described in more detail with reference to FIGS. 4A and 4B.

Figure 4A:
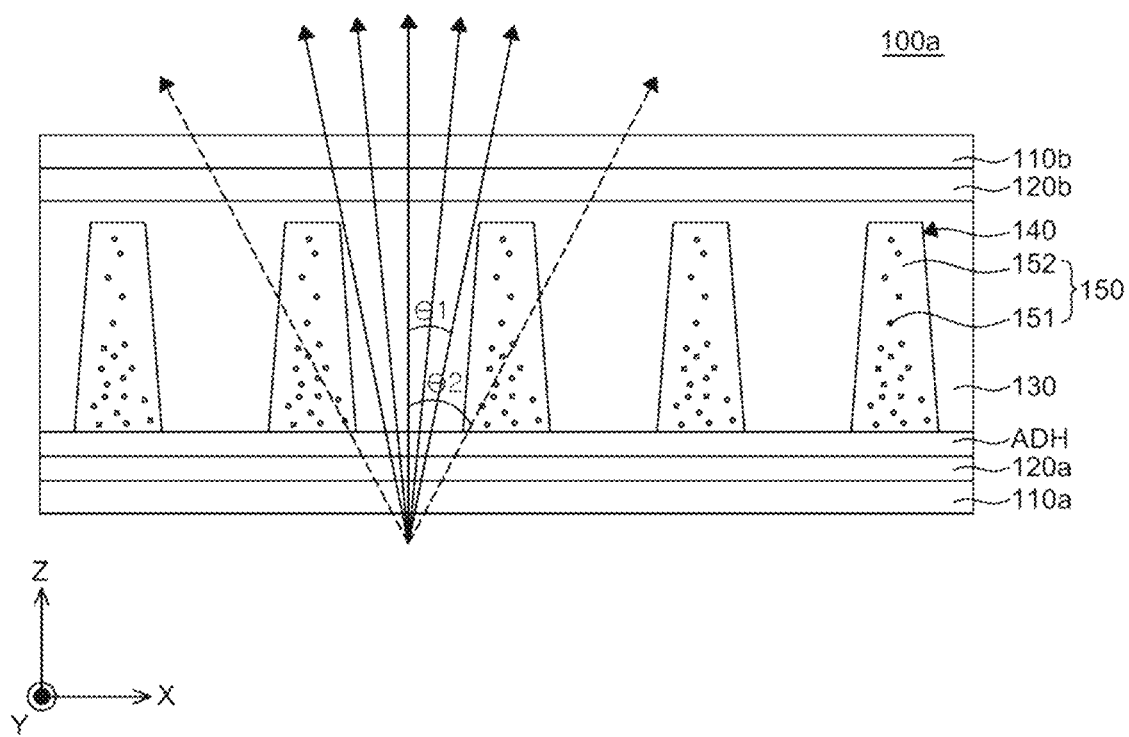
FIG. 4A is a schematic cross-sectional view when a viewing angle controlling film according to an exemplary aspect of the present disclosure is in a narrow viewing angle mode.

FIG. 4A is a schematic cross-sectional view when a viewing angle controlling film according to an exemplary aspect of the present disclosure is in a narrow viewing angle mode. FIG. 4B is a schematic cross-sectional view when a viewing angle controlling film according to an exemplary aspect of the present disclosure is in a wide viewing angle mode.

Referring to FIG. 4A, when an electric field is not formed between the first electrode 120a and the second electrode 120b, the charged hollow carbon blacks 151 are uniformly dispersed in the solvent 152 to be randomly distributed in the plurality of accommodating units 140. As the charged hollow carbon blacks 151 are randomly distributed in the plurality of accommodating units 140 as described above, the plurality of accommodating units 140 absorbs incident light. Accordingly, light which is incident at a predetermined angle or larger is blocked by the plurality of accommodating units 140. That is, among light which is incident from the lower portion of the viewing angle controlling film 100a, light which is incident at a predetermined angle or larger with respect to the front surface (z axis) is absorbed by the charged hollow carbon blacks 151 dispersed in the plurality of accommodating units 140. Therefore, the light is not emitted to the outside of the viewing angle controlling film 100a. For example, among light incident from the lower portion of the viewing angle controlling film 100a, light incident onto the front surface (z axis) at a first angle θ1 is output to the outside of the viewing angle controlling film 100a. However, light which is incident at a second angle θ2 which is larger than the first angle is not emitted to the outside. Accordingly, light which is incident at a predetermined angle or larger is blocked to operate in a narrow viewing angle mode.

Figure 4B:
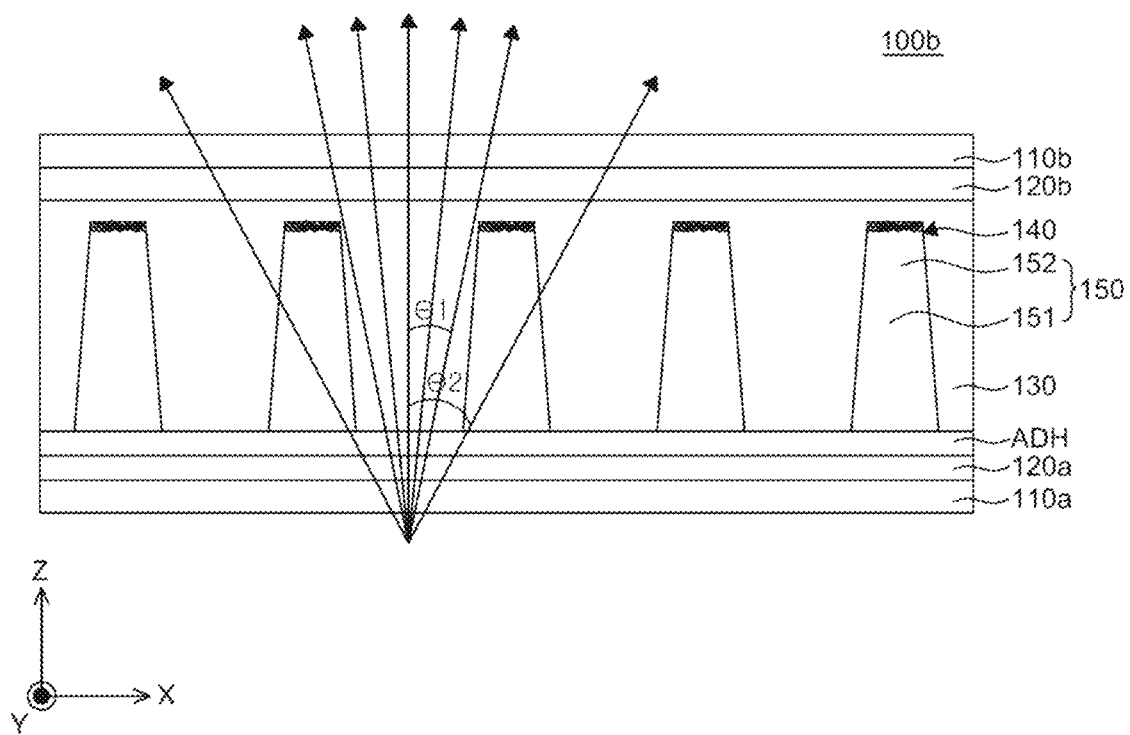
FIG. 4B is a schematic cross-sectional view when a viewing angle controlling film according to an exemplary aspect of the present disclosure is in a wide viewing angle mode.

Referring to FIG. 4B, when a voltage is applied between the first electrode 120a and the second electrode 120b so that the electric field is formed, the charged hollow carbon black 151 which is randomly dispersed in the plurality of accommodating units 140 moves to the electrode by the electric field. That is, the charged hollow carbon black 151 moves to an electrode to which an opposite voltage is applied, according to the charged charge.

For example, when the charged hollow carbon black 151 is charged with a negative charge, if the negative voltage is applied to the first electrode 120a and the positive voltage is applied to the second electrode 120b, the hollow carbon black 151 which is charged with a negative charge moves to an upper surface 142. The upper surface 142 is adjacent to the second electrode 120b to which a positive voltage is applied. Accordingly, the charged hollow carbon black 151 is stacked from the upper surface 142 of the accommodating units 140 with a predetermined thickness. That is, in the most area except for an area adjacent to the upper surface 142 of the accommodating unit 140 in which the charged hollow carbon black 151 is stacked, the density of the charged hollow carbon black 151 is very low. A portion having a very low density of the charged carbon black 151 has a high transparency. Accordingly, light may pass through an area having a low density of the charged hollow carbon black 151. As a result, among light incident from the lower portion of the viewing angle controlling film 100b, not only light incident at a first angle θ1 with respect to the front surface (z axis), but also light incident at the second angle θ2 which is larger than the first angle is emitted to the outside. Accordingly, a traveling angle of light which is emitted to the outside of the viewing angle controlling film 100b is increased as compared with that illustrated in FIG. 4A to operate in the wide viewing angle mode.

As another example, when the charged hollow carbon black 151 is charged with a negative charge, a positive voltage is applied to the first electrode 120a and a negative voltage is applied to the second electrode 120b to operate the wide viewing angle mode similar to FIG. 4B. A redundant description thereof will be omitted.

The viewing angle is controlled by a width W1 of the lower surface 141 of the accommodating unit 140, a width W2 of the upper surface 142, a distance D1 from the lower surface 141 to the upper surface 142 (that is, a height of the accommodating unit 140), distances W3 and W4 between adjacent accommodating units 140, and a gradient of the first and second connection units 143a and 143b.

Referring to FIG. 2, the width W1 of the lower surface 141 may be 5 μm to 30 μm, the width W2 of the upper surface 142 may be 1 μm to 15 μm, and the height D1 of the accommodating unit 140 may be 70 μm to 160 μm. The distance W3 between the lower surfaces 141 of adjacent accommodating units 140 is 15 μm to 50 μm and the distance W4 between upper surfaces 142 is 25 μm to 60 μm. Within this range, in the wide viewing angle mode, a wider viewing angle may be provided without degrading the luminance and in the narrow viewing angle mode, a traveling angle of emitted light is sufficiently small to be implemented as a narrow viewing angle. Further, the width W1 of the lower surface 141 is desirably formed to be larger than the width W2 of the upper surface 142. In this case, in the wide viewing angle mode, a wider viewing angle may be provided.

An angle θa formed by the first connection unit 143a and the lower surface 141 and an angle θb formed by the second connection unit 143b and the lower surface 141 may be 90° to 105°. Within this range, in the wide viewing angle mode, a wide viewing angle may be provided and in the narrow angle mode, a traveling angle of the emitted light is reduced to implement a narrow viewing angle.

Even though in FIGS. 1 and 2, it is illustrated that the angle θa formed by the first connection unit 143a and the lower surface 141 is equal to the angle θb formed by the second connection unit 143b and the lower surface 141. However, it is just an example so that the present disclosure is not limited thereto. The angle θa formed by the first connection unit 143a and the lower surface 141 and an angle θb formed by the second connection unit 143b and the lower surface 141 may be different.

As described above, the upper surface 142 of each of the plurality of accommodating units 141 is spaced apart from the second electrode 120b and a distance D2 from the upper surface 142 to the second electrode 120b is 5 μm to 20 μm.

The transparent resin layer 130 which has an insulating property is formed in a space where the upper surface 142 and the second electrode 120b are spaced apart from each other. Therefore, when the distance D2 is too long, an intensity of the electric field is reduced under the same voltage so that the driving characteristic may be degraded.

In the viewing angle controlling film 100 according to the exemplary aspect of the present disclosure, the ink 150 including the charged hollow carbon black 151 and the solvent 152 is accommodated in the plurality of accommodating units 140. Therefore, the density difference between the solvent 152 and the charged hollow carbon black 151 is significantly reduced. Accordingly, a phenomenon that the charged hollow carbon black 151 is settled by the gravity may be minimized. Further, the dispersion stability of the charged hollow carbon black 151 is improved so that the bistability is improved. Moreover, advantages that the driving speed of the viewing angle controlling film 100 and the switching speed of the wide viewing angle mode and the narrow viewing angle mode are significantly improved are provided.

Figure 5:
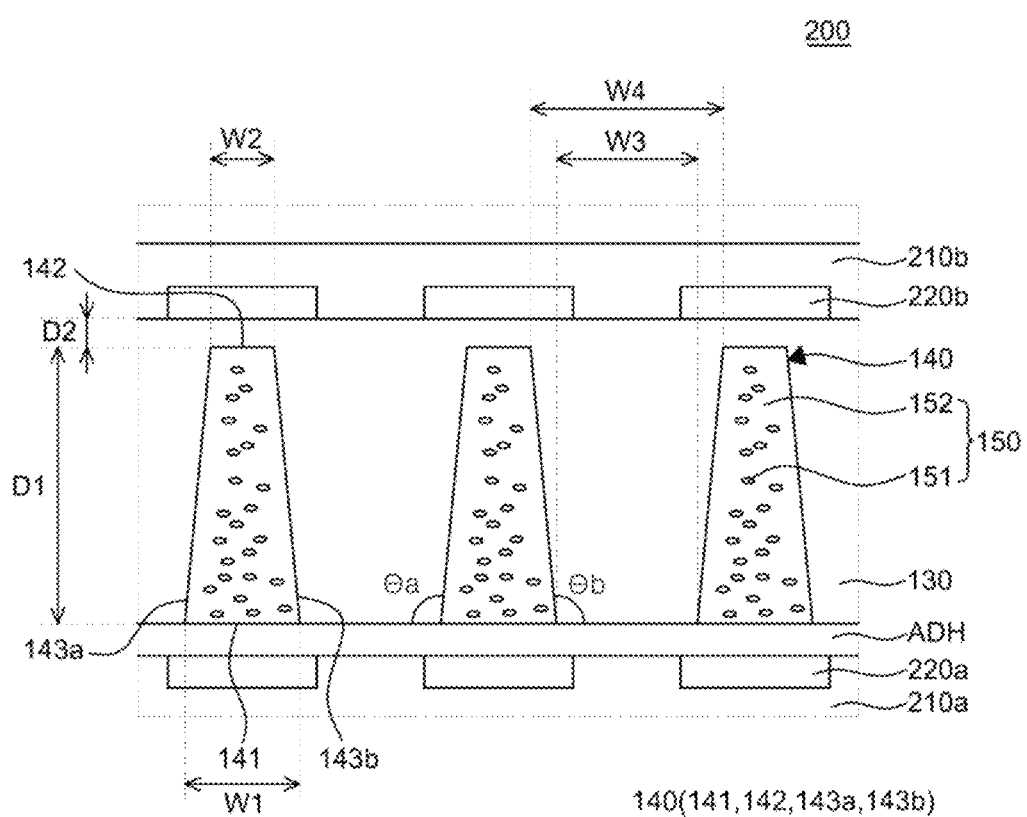
FIG. 5 is a schematic cross-sectional view of a viewing angle controlling film according to another exemplary aspect of the present disclosure.

FIG. 5 is a schematic cross-sectional view of a viewing angle controlling film according to another exemplary aspect of the present disclosure.

A viewing angle controlling film 200 illustrated in FIG. 5 is substantially the same as the viewing angle controlling film 100 illustrated in FIGS. 1 and 2, except that the first electrode and the second electrode are patterned and a structure of the first and second base materials is changed. Accordingly, a redundant description will be omitted. Even though in FIG. 5, it is illustrated that the first electrode and the second electrode have a patterned structure, it is not limited thereto. If necessary, only any one of the first electrode and the second electrode has a patterned structure.

Referring to FIG. 5, a plurality of pattern electrodes 220a is disposed below the adhesive layer ADH and a plurality of second pattern electrodes 220b is disposed above the transparent resin layer 130.

Each of the plurality of first pattern electrodes 220a is disposed so as to overlap each of the plurality of accommodating units 140.

Each of the plurality of first pattern electrodes 220a extends along the second direction (y axis direction) which is perpendicular to the thickness direction (a z axis direction) and the first direction (an x axis direction). Therefore, each of the plurality of first pattern electrodes 220a has a line shape extending along the second direction (y axis direction).

The first base member 210a may be disposed so as to cover the surface and the side surface of the plurality of first pattern electrodes 220a. That is, the first base member 210a is disposed to cover the step formed by the plurality of first pattern electrodes 220a.

Each of the plurality of second pattern electrodes 220b is disposed so as to overlap each of the plurality of first pattern electrodes 220a. Therefore, each of the plurality of second pattern electrodes 220b overlaps each of the plurality of accommodating units 140.

The second pattern electrode 220b has a line shape extending along the second direction (the y axis direction) perpendicular to the thickness direction (the z axis direction) and the first direction (the x axis direction), similarly to the first pattern electrode 220a.

The second base member 210b may be disposed so as to cover the surface and the side surface of the plurality of second pattern electrodes 220b. That is, the second base member 210b is disposed to cover the step formed by the plurality of second pattern electrodes 220b.

For example, widths of the plurality of first electrode patterns 220a and the plurality of second electrode patterns 220b may be 7 μm to 50 μm. However, it is not limited thereto and the width W1 of the lower surface 141 and/or the width W2 of the upper surface 142 may be changed according to the design.

As illustrated in FIG. 5, when the electrode is patterned to be configured as a plurality of pattern electrodes 220a and a plurality of pattern electrodes 220b, a leakage current generated in the transparent resin layer 130 and the adhesive layer ADH may be minimized. As the leakage current is minimized, the mobility of the charged hollow carbon black 151 in the plurality of accommodating units 140 is further improved, the driving characteristic of the viewing angle controlling film, and a mode switching speed may be further improved.

Figure 6:
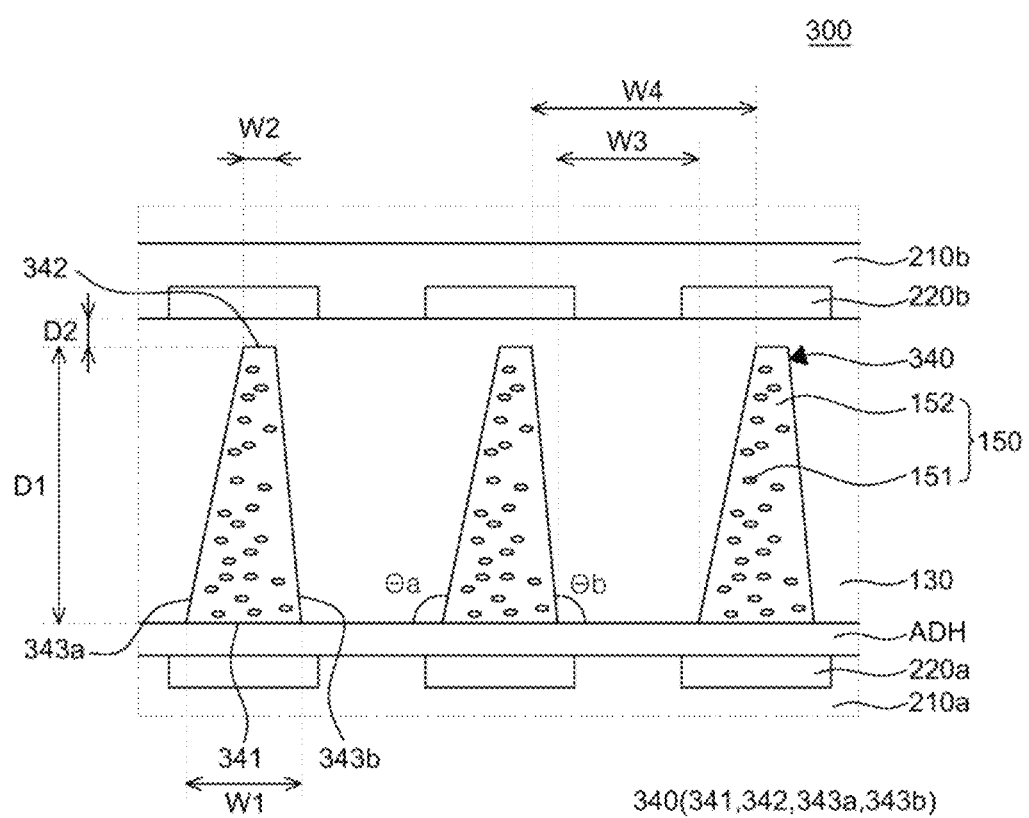
FIG. 6 is a schematic cross-sectional view of a viewing angle controlling film according to another exemplary aspect of the present disclosure.

FIG. 6 is a schematic cross-sectional view of a viewing angle controlling film according to another exemplary aspect of the present disclosure.

A viewing angle controlling film 300 illustrated in FIG. 6 is substantially the same as the viewing angle controlling film 200 illustrated in FIG. 5 except for a width W1 of the lower surface, a width W2 of the upper surface, distances W3 and W4 between adjacent accommodating units, and an angle θa formed by the lower surface and the upper surface. Accordingly, a redundant description will be omitted.

Referring to FIG. 6, an angle θa formed by the lower surface 341 and the first connection unit 343a and an angle θb formed by the lower surface 341 and the second connection unit 343b may be different from each other. As described above, when the angle θa formed by the lower surface 341 and the first connection unit 343a and the angle θb formed by the lower surface 341 and the second connection unit 343b are formed to be different, in the narrow viewing angle mode, a left luminance and a right luminance with respect to the front surface are different. Accordingly, if necessary, the angle θa formed by the lower surface 341 and the first connection unit 343a and the angle θb formed by the lower surface 341 and the second connection unit 343b are formed to be different to control the left luminance and the right luminance.

The angle θa formed by the lower surface 341 and the first connection unit 343a may be larger than the angle θb formed by the lower surface 341 and the second connection unit 343b. The viewing angle controlling film 300 with a structure as described above is used for a display for a vehicle, specifically, an auxiliary display. By doing this, during the driving, the viewing angle controlling film 300 is driven in a narrow viewing angle mode so that a luminance is low in a lateral direction in which a drive seat is located to make the screen look dark, which allows the driver to focus more on the driving. However, it is not limited thereto and according to the location of the driver seat or if necessary, the angle θb formed by the lower surface 341 and the second connection unit 343b may be formed to be larger than the angle θa formed by the lower surface 341 and the first connection unit 343a.

Specifically, the angle θa formed by the lower surface 341 and the first connection unit 343a is 96° to 106° and the angle θb formed by the lower surface 341 and the second connection unit 343b is 90° to 95°. In this case, in the narrow viewing angle mode, a sufficiently low luminance is provided to the lateral direction in which the driver seat is located so that the driver cannot watch the display. Therefore, the driver may focus on the driving and a passenger in a passenger seat may watch the display with a high luminance.

For example, the width W1 of the lower surface 341 is 15 μm to 30 μm and the width of the upper surface 342 is 1 μm to 8 μm, but it is not limited thereto. For example, the distance W3 between the lower surfaces 340 of adjacent accommodating units 341 is 15 μm to 25 μm and the distance W4 between upper surfaces 342 is 25 μm to 45 μm, but is not limited thereto. Within this range, in the wide viewing angle mode, a wider viewing angle may be provided without degrading the luminance and in the narrow viewing angle mode, a traveling angle of emitted light becomes small to be implemented as a narrow viewing angle.

The viewing angle controlling film 100 of the present disclosure is used for an organic light emitting display device or a liquid crystal display device.

Figure 7:
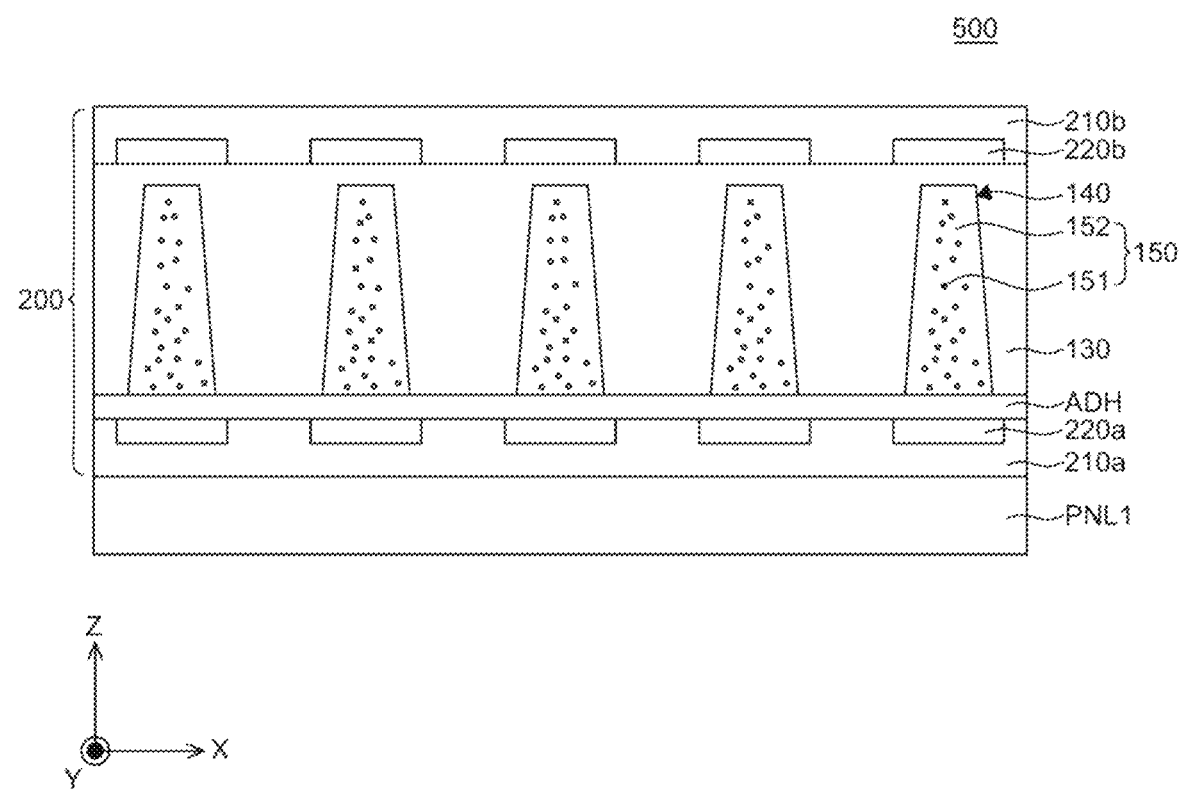
FIG. 7 is a schematic cross-sectional view of an organic light emitting display device according to an exemplary aspect of the present disclosure.

FIG. 7 is a schematic cross-sectional view of an organic light emitting display device according to an exemplary aspect of the present disclosure. Referring to FIG. 7, an organic light emitting display device 500 according to an exemplary aspect of the present disclosure includes an organic light emitting display panel PNL1 and a viewing angle controlling film 200. The viewing angle controlling film 200 includes a first base material 210a, a first pattern electrode 220a, a transparent resin layer 130, a second pattern electrode 220b, and a second base material 210b. The viewing angle controlling film 200 in the organic light emitting display device 500 illustrated in FIG. 7 is substantially the same as the viewing angle controlling film 200 illustrated in FIG. 5. Therefore, a redundant description will be omitted.

The organic light emitting display panel PNL1 includes an organic light emitting layer to display images using light emitted therefrom. For example, the organic light emitting display panel PNL1 includes a substrate, a thin film transistor, an anode, an organic light emitting stack, a cathode, and an encapsulation layer.

The substrate is a base member which supports various elements of the organic light emitting display panel PNL1 and is formed of an insulating material. For example, the substrate may be a glass substrate or a plastic substrate. For example, the plastic substrate may be selected from polyimide, polyethersulfone, polyethylene terephthalate, and polycarbonate, but is not limited thereto.

The thin film transistor is disposed on the substrate. The thin film transistor includes a gate electrode, an active layer, a source electrode, and a drain electrode. For example, the active layer is disposed on the substrate and a gate insulating layer is disposed on the active layer to insulate the active layer from the gate electrode. Further, an interlayer insulating layer which insulates the gate electrode from the source electrode and the drain electrode is disposed on the substrate. The source electrode and the drain electrode which are in contact with the active layer are formed on the interlayer insulating layer. A planarization layer may be disposed on the thin film transistor. The planarization layer planarizes an upper portion of the thin film transistor. The planarization layer may include a contact hole which electrically connects the thin film transistor and the anode.

The anode is disposed on the planarization layer. The anode is a component which supplies holes to the organic light emitting layer and is formed of a conductive material having a high work function. The anode may be divided for each of the sub pixels. The cathode is disposed on the anode. The cathode may be formed of a metal material having a low work function to smoothly supply electrons to the organic light emitting layer. The cathode is formed on the anode as one layer without being patterned. That is, the cathode is not divided for every sub pixel area but is formed as a continuous single layer. The organic light emitting layer is disposed between the anode and the cathode. The organic light emitting layer is a layer in which electrons and holes are coupled to emit light. An encapsulation layer which minimizes degradation of the display panel due to moisture or oxygen and planarizes an upper surface of the organic light emitting display panel PNL1 is disposed on the cathode.

The viewing angle controlling film 200 is disposed on the organic light emitting display panel PNL1. For example, the viewing angle controlling film 200 is disposed on the encapsulation layer of the organic light emitting display panel PNL1.

The viewing angle controlling film 200 is disposed on the organic light emitting display panel PNL1 to provide a narrow viewing angle mode and a wide viewing angle mode. The narrow viewing angle mode provides a narrow viewing angle to allow the user to see an image formed by light emitted from the organic light emitting layer of the organic light emitting display panel PNL1. The wide viewing angle mode provides a wide viewing angle to allow the other people in the vicinity thereof to see the image. The configuration of the viewing angle controlling film 200, the narrow viewing angle mode, and the wide viewing angle mode are the same as those described above with reference to FIGS. 1 to 3, 4A, 4B, and 5 so that a redundant description thereof will be omitted.

Figure 8:
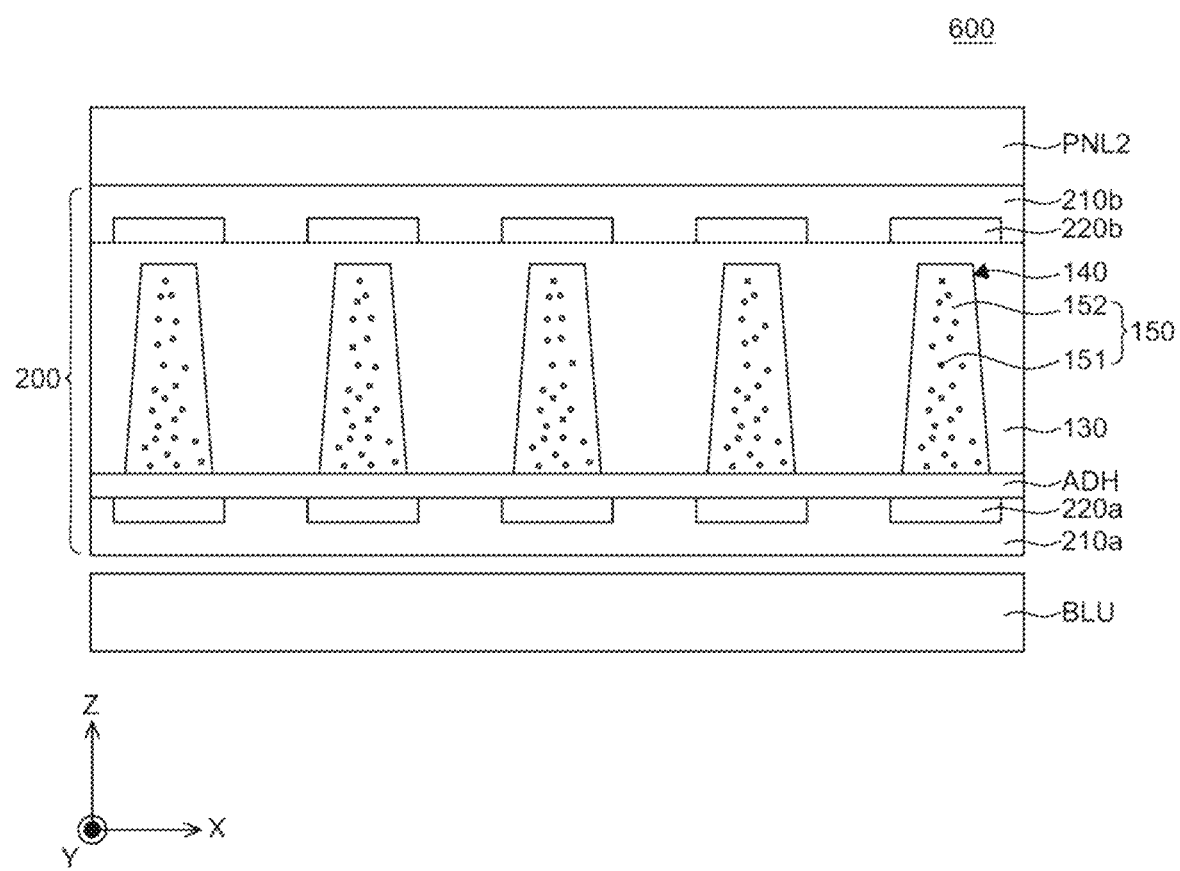
FIG. 8 is a schematic cross-sectional view of a liquid crystal display device according to an exemplary aspect of the present disclosure.

FIG. 8 is a schematic cross-sectional view of a liquid crystal display device according to an exemplary aspect of the present disclosure. Referring to FIG. 8, a liquid crystal display device 600 according to an exemplary aspect of the present disclosure includes a backlight unit BLU, a viewing angle controlling film 200, and a liquid crystal display panel PNL2. The viewing angle controlling film 200 includes a first base material 210a, a first pattern electrode 220a, a transparent resin layer 130, a second pattern electrode 220b, and a second base material 210b. The viewing angle controlling film 200 in the liquid crystal display device 600 illustrated in FIG. 8 is substantially the same as the viewing angle controlling film 200 illustrated in FIG. 5. Therefore, a redundant description will be omitted.

The backlight unit BLU includes a plurality of light sources to supply light to the liquid crystal display panel PNL2. A plurality of light sources is electrically connected to a printed circuit board to be turned on or off. For example, the light source may be a light emitting diode (LED) having advantages of high efficiency, high luminance, and low power consumption, but is not limited thereto.

The backlight unit BLU includes a light diffusion plate disposed on the plurality of light sources to condense and diffuse light emitted from the plurality of light sources so that the light is evenly incident on the liquid crystal display panel PNL2.

A reflective layer which reflects light generated from the light source to the front surface is disposed on a rear surface of the back light unit BLU.

The liquid crystal display panel PNL2 is disposed on the backlight unit BLU. The liquid crystal display panel PNL2 includes a liquid crystal layer and controls light transmittance of the liquid crystal to display images.

For example, the liquid crystal display panel PNL2 includes a lower substrate, an upper substrate, a lower polarizer, and an upper polarizer.

The lower substrate supports various components which configures the liquid crystal display panel PNL2. On the lower substrate, a thin film transistor, a pixel electrode which is electrically connected to the thin film transistor, and a common electrode which forms an electric field together with the pixel electrode are disposed. Therefore, the lower substrate may be referred to as a thin film transistor substrate. A liquid crystal layer including liquid crystal molecules is disposed on the thin film transistor substrate.

The upper substrate faces the lower substrate. A color filter layer and a black matrix layer are disposed on the upper substrate. The color filter layer selectively transmits light having a specific wavelength. Light emitted from the backlight unit BLU passes through the liquid crystal layer and the color filter to be converted into light having various colors. The black matrix layer does not allow the thin film transistor disposed on the lower substrate to be visible to the outside of the liquid crystal display device 600.

The lower polarizer is disposed on a lower surface of the lower substrate to polarize light emitted from the backlight unit BLU toward the liquid crystal display panel PNL2. The upper polarizer is disposed on an upper surface of the upper substrate and polarizes light emitted to the outside of the liquid crystal display panel PNL2.

The viewing angle controlling film 200 is disposed between the backlight unit BLU and the liquid crystal display panel PNL2. The viewing angle controlling film 200 controls a traveling angle of light emitted from the backlight unit BLU to provide a wide viewing angle mode and a narrow viewing angle mode.

Specifically, the viewing angle controlling film 200 is disposed on the backlight unit BLU to provide a narrow viewing angle mode and a wide viewing angle mode. In the narrow viewing angle mode, a viewing angle of light incident from the backlight unit BLU is controlled to be narrow so that the image displayed on the liquid crystal display panel PNL2 is visible to the user. In the wide viewing angle mode, a viewing angle of light incident from the backlight unit BLU is controlled to be wide so that a wide viewing angle is provided to allow the surrounding people to see the image displayed on the liquid crystal display panel PNL2. The configuration of the viewing angle controlling film 200, the narrow viewing angle mode, and the wide viewing angle mode are the same as those described above with reference to FIGS. 1 to 3, 4A, 4B, and 5 so that a redundant description thereof will be omitted.

Hereinafter, the effects of the present disclosure will be described in more detail with reference to Examples and Comparative Examples. However, the following Examples are set forth to illustrate the present disclosure, but the scope of the disclosure is not limited thereto.

EXAMPLES 1-1 TO 1-5

10 g of hollow carbon black (BET surface area was 1270 m²/g and a volume fraction of a hollow portion was 80 vol. %) was added to 100 ml of nitric acid or sulfuric acid having a concentration of 65 wt. % and agitated at 100 degrees for 24 hours to react. After completing the reaction, centrifugation was performed at 7500 rpm for 15 minutes and then precipitate was separated and cleansing was performed with distilled water. Next, it was dried at 120 degrees for 24 hours to obtain a hollow carbon black with a surface modified with a functional group —COOH group. Next, after preparing a solvent Isopar L (density was 0.764 g/cm³) in a separate container, polyisobutylene succinimide amine (Trade name T151) was added at a concentration of 3 wt. %. Next, a surface-modified hollow carbon black was added to the solvent-dispersant mixed solution at a concentration of 2 wt. %, followed by ultrasonic treatment for 2 hours. Next, the ink was prepared by performing centrifugation at 2500 rpm for 30 minutes to remove impurities and ultrasonic treatment for 3 hours. By doing this, inks having average particle sizes of 130 nm, 150 nm, 200 nm, 300 nm, and 500 nm of the hollow carbon black dispersed in the ink were prepared.

COMPARATIVE EXAMPLES 1-1 TO 1-5

10 g of carbon black (BET surface area was 90 m²/g) was added to 100 ml of nitric acid or sulfuric acid having a concentration of 65 wt. % and agitated at 100 degrees for 24 hours to react. After completing the reaction, centrifugation was performed at 7500 rpm for 15 minutes and then precipitate was separated and cleansing was performed with distilled water. Next, it was dried at 120 degrees for 24 hours to obtain a carbon black with a surface modified with a functional group —COOH group. Next, after preparing a solvent Isopar L (density was 0.764 g/cm³) in a separate container, polyisobutylene succinimide amine (Trade name T151) was added at a concentration of 3 wt. %. Next, a surface-modified carbon black was added to the solvent-dispersant mixed solution at a concentration of 3 wt. %, followed by ultrasonic treatment for 2 hours. Next, the ink was prepared by performing centrifugation at 2500 rpm for 30 minutes to remove impurities and ultrasonic treatment for 3 hours. By doing this, inks having average particle sizes of 130 nm, 150 nm, 200 nm, 300 nm, and 500 nm of the carbon black dispersed in the ink were prepared.

EXPERIMENTAL EXAMPLE 1

Physical properties of inks according to Examples 1-1 to 1-5 and Comparative Examples 1-1 to 1-5 were evaluated. Dispersion analyzer (LUMiSizer) and software SEPView for physical property evaluation were used. An average particle size of carbon black, a density of carbon black, a density difference of a solvent and carbon black, and an instable index of the ink, and a settling speed of particles were represented in Table 1 and FIGS. 9A and 9B. The instable index was obtained by measuring a transmittance of the ink over the time and analyzing a shape and a changing pattern of the transmittance profile to be represented as a numerical value. Therefore, the smaller the instable index, the more excellent the dispersion stability. (At this time, a concentration difference between samples was excluded). The particle settling speed was analyzed under the accelerated gravity (150 G, 500 G, and 2000 G) using a centrifugal force.

Figure 9A:
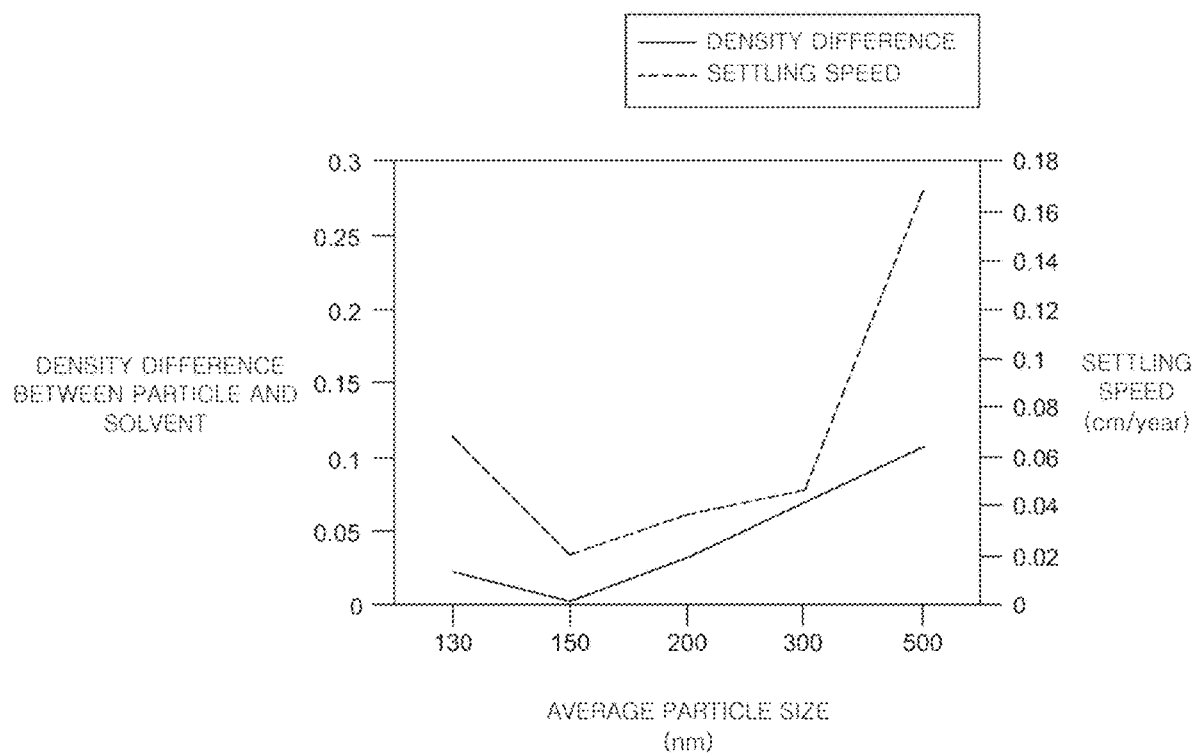
FIG. 9A is a graph illustrating a density difference of a particle and a solvent and a settling speed according to an average particle size of a hollow carbon black.
Figure 9B:
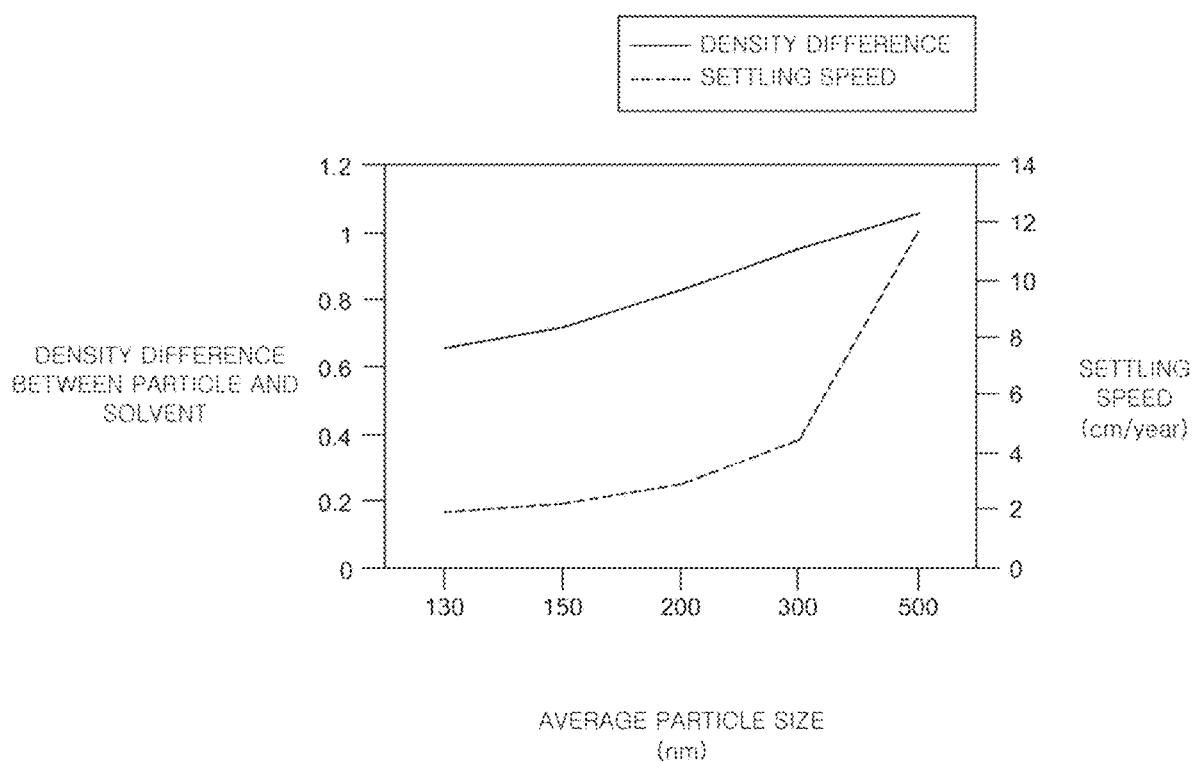
FIG. 9B is a graph illustrating a density difference of a particle and a solvent and a settling speed according to an average particle size of a carbon black.

FIG. 9A is a graph illustrating a density difference of a particle and a solvent and a settling speed according to an average particle size of a hollow carbon black. FIG. 9B is a graph illustrating a density difference of a particle and a solvent and a settling speed according to an average particle size of a carbon black.

TABLE 1

| | Average particle size (nm) | CB Density (g/cm³) | Density difference | Instable index | Settling speed (cm/year) |
|---|---|---|---|---|---|
| Ex. 1-1 | 130 | 0.786 | 0.022 | 0.004 | 0.068 |
| Ex. 1-2 | 150 | 0.766 | 0.002 | 0.001 | 0.019 |
| Ex. 1-3 | 200 | 0.732 | 0.032 | 0.009 | 0.037 |
| Ex. 1-4 | 300 | 0.693 | 0.071 | 0.013 | 0.046 |
| Ex. 1-5 | 500 | 0.658 | 0.106 | 0.044 | 0.168 |

TABLE 1-continued

|  | Average particle size (nm) | CB Density (g/cm³) | Density difference | Instable index | Settling speed (cm/year) |
|---|---|---|---|---|---|
| Comp. Ex. 1-1 | 130 | 1.422 | 0.658 | 0.075 | 1.902 |
| Comp. Ex. 1-2 | 150 | 1.483 | 0.719 | 0.083 | 2.208 |
| Comp. Ex. 1-3 | 200 | 1.591 | 0.827 | 0.256 | 4.478 |
| Comp. Ex. 1-4 | 300 | 1.713 | 0.948 | 0.256 | 4.478 |
| Comp. Ex. 1-5 | 500 | 1.820 | 1.056 | 0.565 | 11.621 |

First, referring to Table 1 and FIGS. 9A and 9B, it was confirmed that the carbon black included in the ink of Examples 1-1 to 1-5 had a hollow structure having a volume ratio of a hollow portion of 80 vol. % so that the density was significantly lower than that of the carbon black included in the ink of Comparative Examples 1-1 to 1-5. Accordingly, it is confirmed that in the ink according to Examples, the density difference between the carbon black and the solvent is almost the same with at least 0.002. In contrast, it is confirmed that the density difference between the carbon black and the solvent of the ink according to Comparative Examples is significantly higher than that of Examples to be at least 0.658, which is 6 times higher than the maximum value of 0.106.

Further, the instable index of the ink according to the exemplary aspect is 0.001 to 0.044, but the instable index of the ink according to Comparative Examples is 0.075 to 0.565, which is very high.

Further, it is confirmed that a settling speed of the particle of the ink according to Examples is 0.019 cm/year to 0.168 cm/year, which is very low, but a settling speed of the particle of the ink according to Comparative Examples is 1.902 cm/year to 11.621 cm/year, which is almost 100 times that of Examples.

In summary of the above result, when the hollow carbon black is used as a light absorbing material, as compared with a carbon black which does not have a hollow structure, the density difference between the particles and the solvent is significantly reduced. Accordingly, it is confirmed that the dispersion stability of the ink is excellent and the settling speed of the particle is largely reduced so that the settling of the particles due to the gravity may be minimized. Specifically, from the results of Examples 1-1 to 1-5, it is confirmed that in the range of 130 nm to 200 m of the average particle size of the hollow carbon black dispersed in the ink which is lower than 300 nm, the dispersion stability of the ink is more excellent and the particle settling due to the gravity is effectively suppressed.

EXPERIMENTAL EXAMPLE 2

A charge amount (zeta potential) of the carbon black and a viscosity of the ink was additionally measured for Example 1-2 and Comparative Example 1-1 in which the density difference, the instable index, and the settling speed are the lowest in the Example group and the Comparative Example group were measured.

As a result of measurement, it was confirmed that a zeta potential of the ink according to Example 1-2 was −26 mV and the viscosity (25° C.) was 1.74 cP. Further, it was confirmed that a zeta potential of the ink according to Comparative Example 1-1 was −18 mV and the viscosity (25° C.) was 3.29 cP.

The ink according to Example 1-2 has more excellent electric characteristic and lower viscosity than those of the ink according to Comparative Example 1-1. Accordingly, when the ink according to Example 1-2 is applied to the viewing angle controlling film, it is expected that the driving characteristic is more excellent than the ink of Comparative Example 1-1.

EXAMPLE 2

Two sheets of cycloolefin films having a thickness of 125 μm in which a plurality of ITO pattern electrodes (an electrode material was ITO and a thickness of each pattern electrode was 200 nm and a width was 20 μm) was prepared. A transparent resin layer (thickness was 105 μm) including an acrylic resin was formed on the ITO pattern electrode of the first cycloolefin film. At this time, a plurality of accommodating units was formed on the transparent resin layer using an imprint process (or a master mold process). Next, the ink prepared in Example 1-2 was injected into the plurality of accommodating units. Next, a second cycloolefin film and the first cycloolefin film on which a transparent resin layer was formed were bonded using an optically clear adhesive layer (20 μm) to prepare a viewing angle controlling film having the same structure as illustrated in FIG. 6. (Wb: 21.5 μm, W2: 5 μm, W3: 20.44 μm, W4: 37 μm, D1: 105 μm, D2: 10 μm, θa: 97°, θb: 92°)

COMPARATIVE EXAMPLE 2

In Example 2, the viewing angle controlling film was prepared using the same method as Example 2 except that instead of the ink according to Example 1-2, the ink according to Comparative Example 1-1 was injected in the plurality of accommodating units.

EXPERIMENTAL EXAMPLE 3

In order to find out a driving characteristic of a viewing angle controlling film prepared according to Example 2 and Comparative Example 2, a luminance change over the time was measured. The luminance was measured using SpectraDuo PR-680 after bonding a viewing angle controlling film on an organic light emitting display panel. The result thereof was illustrated in FIGS. 10, 11A, and 11B.

Further, the viewing angle controlling film prepared according to Example 2 and Comparative Example 2 was stored at 60° C. for 1000 hours to accelerate the settling of the particle, and then whether the particles were settled was evaluated with the naked eye. The result thereof was illustrated in FIGS. 12A, 12B, 13A, and 13B.

Figure 10:
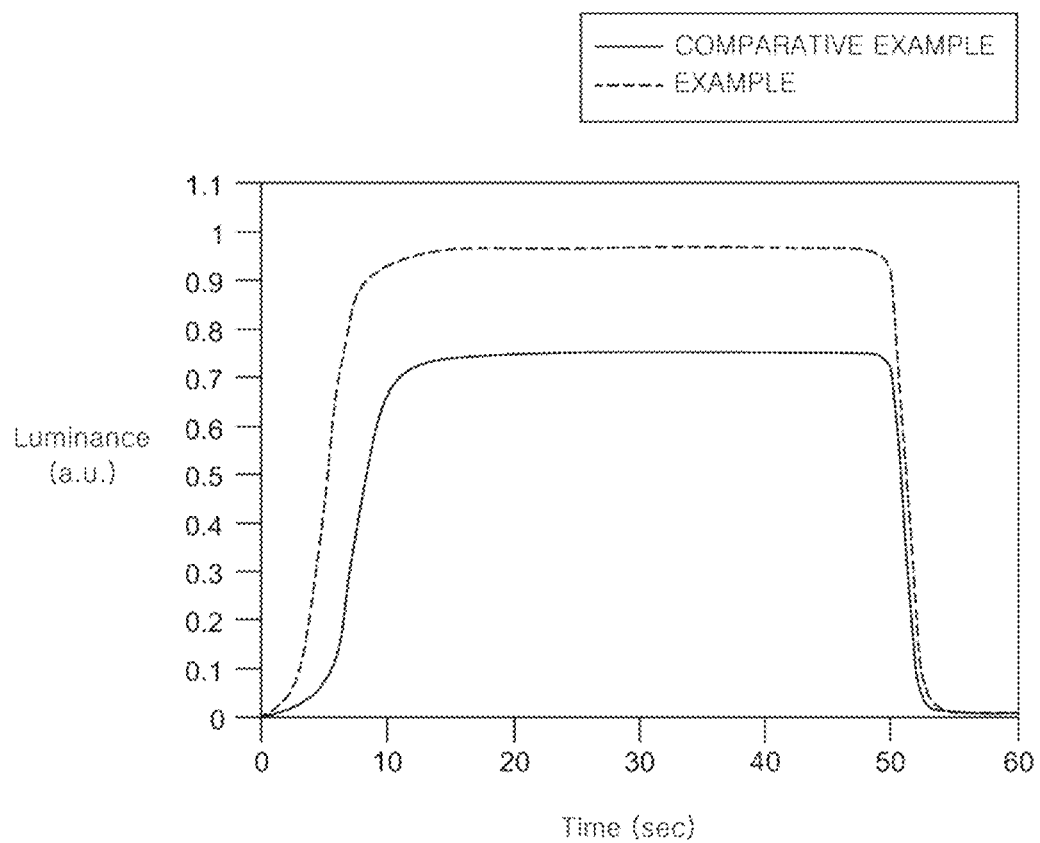
FIG. 10 is a graph illustrating a luminance change over the time of a viewing angle controlling film according to Example 2 and Comparative Example 2.
Figure 11A:
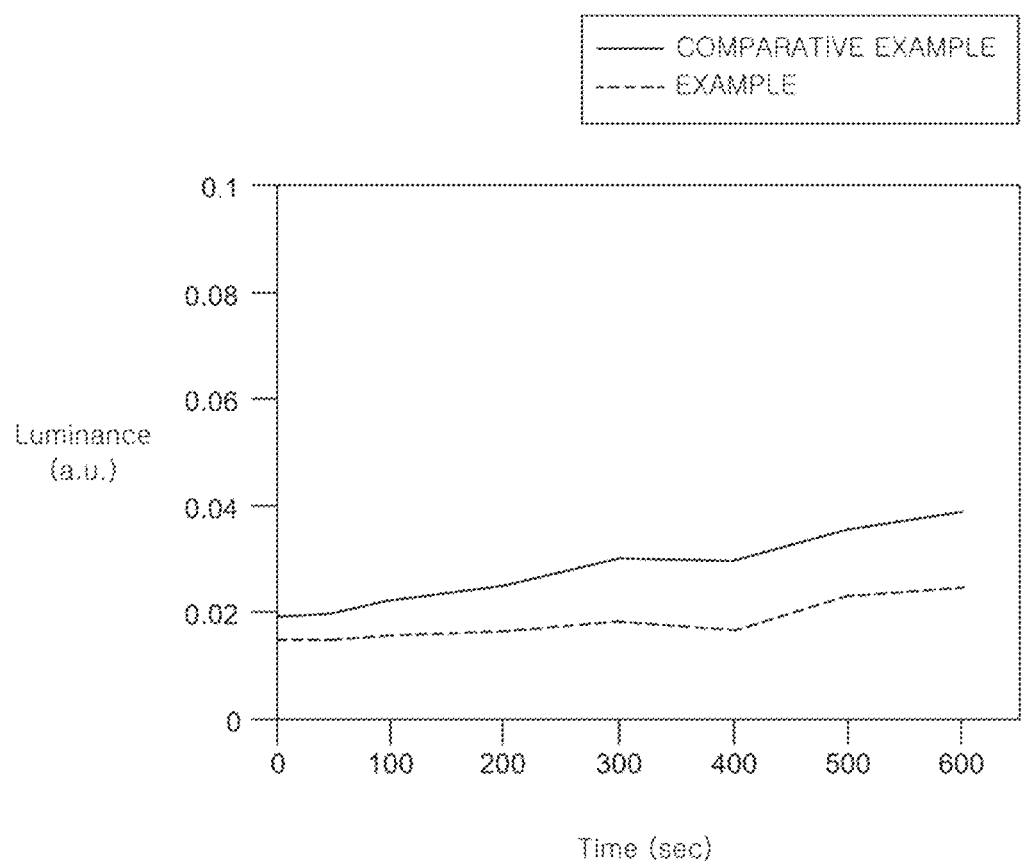
FIG. 11A is a graph illustrating a luminance change over the time of a narrow viewing angle mode of a viewing angle controlling film according to Example 2 and Comparative Example 2.
Figure 11B:
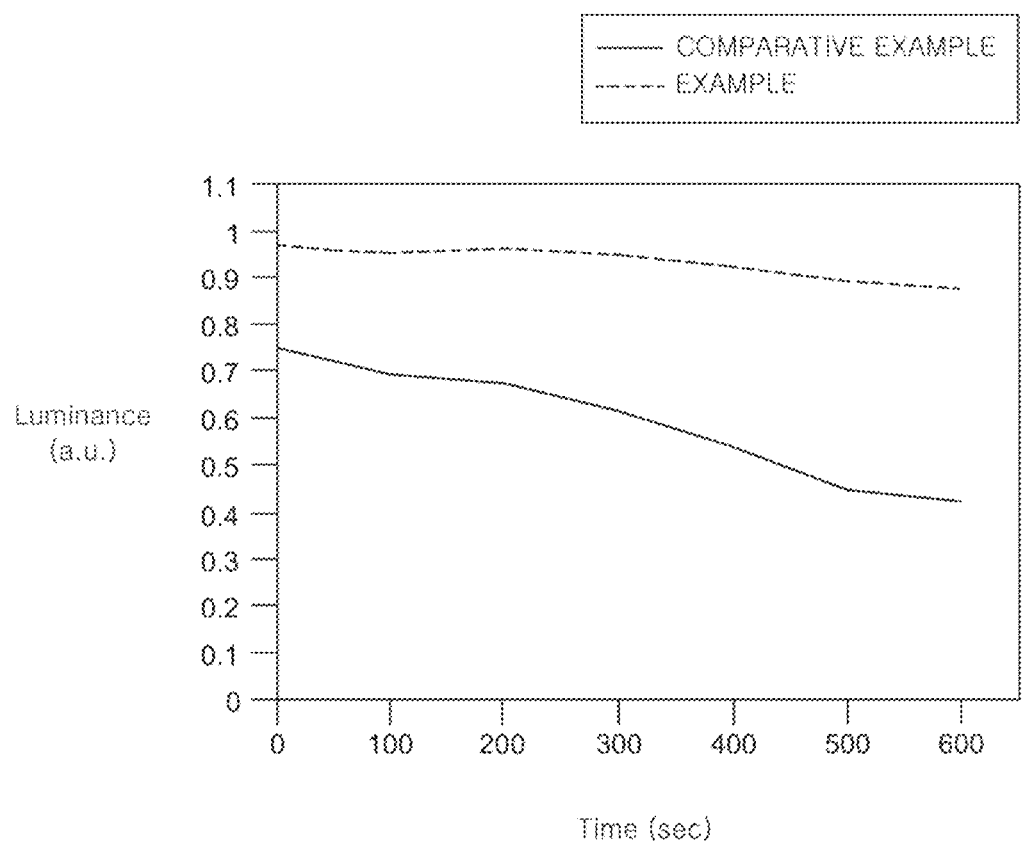
FIG. 11B is a graph illustrating a luminance change over the time of a wide viewing angle mode of a viewing angle controlling film according to Example 2 and Comparative Example 2.
Figure 12A:
FIG. 12A is a photograph seen from the front when a viewing angle controlling film according to Example 2 is in a narrow viewing angle mode.
Figure 12B:
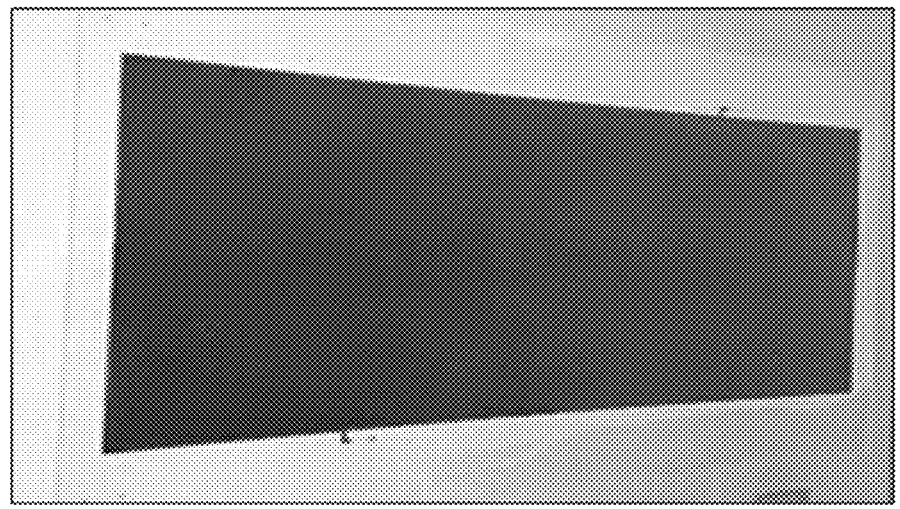
FIG. 12B is a photograph seen from the 30°-side surface when a viewing angle controlling film according to Example 2 is in a narrow viewing angle mode.
Figure 13A:
FIG. 13A is a photograph from the front when a viewing angle controlling film according to Comparative Example 2 is a narrow viewing angle mode.
Figure 13B:
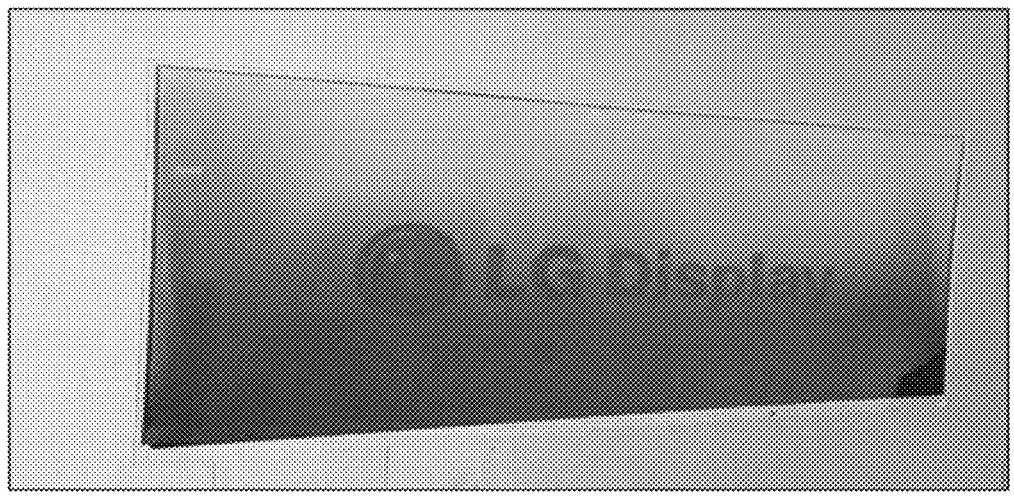
FIG. 13B is a photograph seen from the 30°-side surface when a viewing angle controlling film according to Comparative Example 2 is a narrow viewing angle mode.

FIG. 10 is a graph illustrating a luminance change over the time of a viewing angle controlling film according to Example 2 and Comparative Example 2. FIG. 11A is a graph illustrating a luminance change over the time of a narrow viewing angle mode of a viewing angle controlling film according to Example 2 and Comparative Example 2. FIG. 11B is a graph illustrating a luminance change over the time of a wide viewing angle mode of a viewing angle controlling film according to Example 2 and Comparative Example 2. FIG. 12A is a photograph from the front when a viewing angle controlling film according to Example 2 is in a narrow viewing angle mode. FIG. 12B is a photograph seen from the 30°-side surface when a viewing angle controlling film according to Example 2 is in a narrow viewing angle mode. FIG. 13A is a photograph from the front when a viewing angle controlling film according to Comparative Example 2 is in a narrow viewing angle mode. FIG. 13B is a photograph seen from the 30°-side surface when a viewing angle controlling film according to Comparative Example 2 is in a narrow viewing angle mode.

First, referring to FIG. 10, it was confirmed that the viewing angle controlling film according to Example 2 had a higher luminance than that of the viewing angle controlling film according to Comparative Example 2. It was confirmed that the ink according to Example 1-2 had a higher charge quantity than that of the ink according to Comparative Example 1-1 so that the electric characteristic was excellent. That is, it was determined that luminance of Example 2 was significantly improved more than that of Comparative Example 2 by the improvement of the electric characteristic of the ink according to Example 1-2.

Further, the mode switching speed of Example 2 is 6.6 seconds and the mode switching speed of Comparative Example 2 is 9.5 seconds so that the mode switching speed of the viewing angle controlling film of Example 2 is excellent more than the mode switching speed of Comparative Example 2. It was confirmed that the ink according to Example 1-2 had a lower viscosity than that of the ink according to Comparative Example 1-1. The lower the viscosity, the better the mobility of the charged carbon black when a voltage is applied to the viewing angle controlling film. That is, it is considered that the viewing angle controlling film according to Example 2 includes the ink having a viscosity lower than that of Comparative Example 2 so that the mode switching speed is faster than that of Comparative Example 2.

Referring to FIGS. 11A and 11B together, it is confirmed that the luminance of the viewing angle controlling film according to Example 2 is lower than that of the viewing angle controlling film according to Comparative Example 2 in the narrow viewing angle mode and is higher than that in the wide viewing angle mode. Accordingly, it is confirmed that the bistability of the ink of Example 2 is more excellent than that Comparative Example 2 and thus the driving characteristic is more excellent in both the narrow viewing angle mode and the wide viewing angle mode.

Further, referring to FIG. 11B, it is confirmed that in the viewing angle controlling film according to Example 2, the luminance is stably maintained without being degraded over the time, but the luminance of the viewing angle controlling film according to Comparative Example 2 is sharply lowered after 100 seconds. As a result, it is understood that in the ink used for the viewing angle controlling film according to Example 2, the settling of the particle is minimized and the dispersion stability of the ink is excellent more than that of the ink of Comparative Example 2. It is determined that in the ink used for the viewing angle controlling film of Comparative Example 2, the particles are settled due to the gravity so that as illustrated in FIG. 11B, the luminance is gradually degraded.

Referring to FIGS. 12A and 12B, it is confirmed that a front luminance in the narrow viewing angle mode of the viewing angle controlling film according to Example 2 is excellent and the screen as seen from a 30°-side surface is completely shielded. In contrast, referring to FIGS. 13A and 13B, it is confirmed that in the narrow viewing angle mode, the front luminance of the viewing angle controlling film according to Comparative Example 2 is degraded as compared with Example. Further, it is confirmed that in the viewing angle controlling film according to Comparative Example 2, the screen is not shielded from the 30°-side surface. Accordingly, it is understood that in the ink used for the viewing angle controlling film of Comparative Example 2, the particles cannot maintain the dispersed state, but may be easily settled due to the gravity.

EXPERIMENTAL EXAMPLE 4

A photo profile of the viewing angle controlling film according to Example 2 was analyzed. After bonding the viewing angle controlling film according to Example 2 onto the organic light emitting display panel, the luminance according to the viewing angle change was measured in the wide viewing angle mode and the narrow viewing angle mode. The photo profile analysis result was represented in FIG. 14 and Table 2 and as a reference example, a photo profile analysis result of an organic light emitting display panel which does not include a viewing angle controlling film is also represented.

Figure 14:
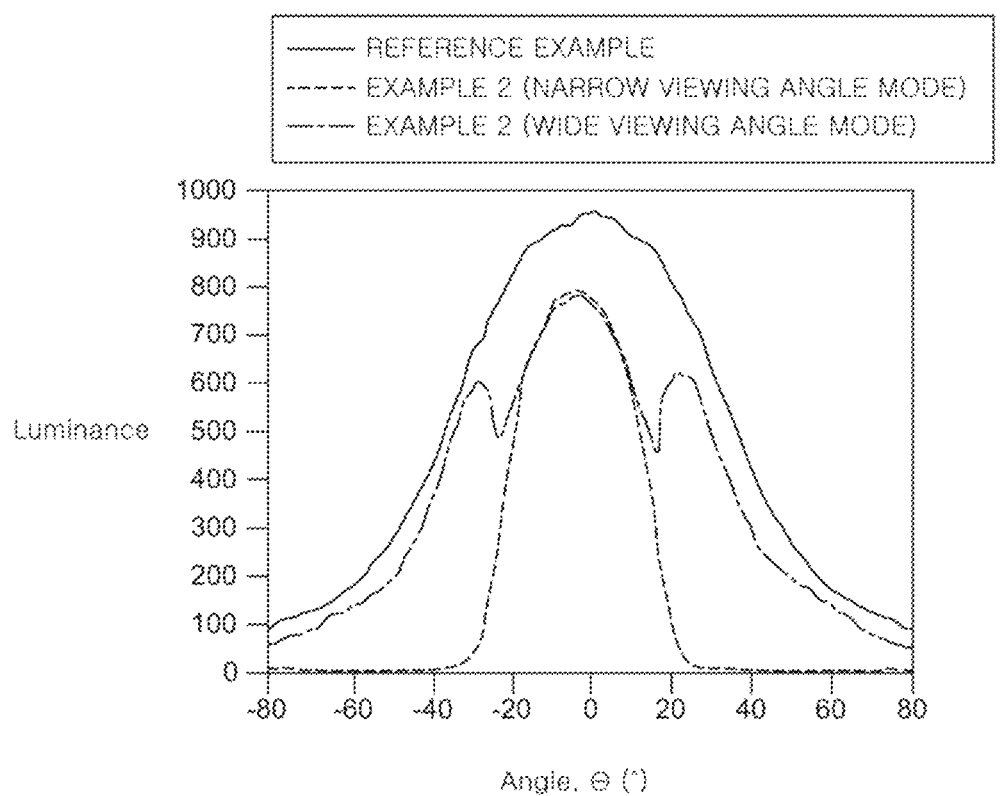
FIG. 14 is a graph illustrating a luminance distribution according to a viewing angle change of an organic light emitting display device according to Example 2 and a reference example.

FIG. 14 is a graph illustrating a luminance distribution according to a viewing angle change of an organic light emitting display device according to Example 2 and a reference example.

TABLE 2

| | Example 2 (Narrow viewing angle mode) | Example 2 (Wide viewing angle mode) | Reference Example |
|---|---|---|---|
| Front (0°) transmittance | 81% | 80% | 100% |
| Lateral (29°) transmittance | 1.1% | 69% | 68.3% |
| Lateral (−29°) transmittance | 5.6% | 78.6% | 68.9% |

Referring to Table 2 and FIG. 14 together, the photo profile of the organic light emitting display device according to the reference example 2 which does not include a viewing angle controlling film follows a Gaussian function curve in which both side surface are symmetrical with respect to the front surface 0°. Accordingly, the transmittance of 29°-side surface and the transmittance of −29°-side surface are equal with respect to the front surface.

It is confirmed that the front (0°) transmittance of the organic light emitting display device including a viewing angle controlling film according to Example 2 in the narrow viewing angle mode is very high, but the transmittance is very low out of the range of the viewing angle of −20° to 15°. Accordingly, the organic light emitting display device including a viewing angle controlling film according to Example 2 has a low lateral transmittance in the narrow viewing angle mode so that the screen looks dark.

It is confirmed that the organic light emitting display device including a viewing angle controlling film according to Example 2 shows a relatively high transmittance in the wide viewing angle mode within the wide viewing angle range as compared with the narrow viewing angle mode. The organic light emitting display device according to Example 2 provides a viewing angle which is equal to that of the reference example, in the wide viewing angle mode.

Further, in the viewing angle controlling film according to Example 2, an angle θa formed by a lower surface of the accommodating unit and a first connection unit and an angle θb formed by the lower surface and a second connection unit are formed to be different. Therefore, it is confirmed that in the wide viewing angle mode and the narrow angle mode, the transmittance of 29°-side surface is significantly different from the transmittance of −29°-side surface.

The exemplary aspects of the present disclosure can also be described as follows:

According to an aspect of the present disclosure, a viewing angle controlling film comprises a first base material; a first electrode disposed on the first base material; a transparent resin layer which is disposed on the first electrode and has a plurality of accommodating units; a second electrode disposed on the transparent resin layer; and a second base material disposed on the second electrode, wherein an ink including a charged hollow carbon black and a solvent is accommodated in each of the plurality of accommodating units.

Each of the plurality of accommodating units may be formed to face the second electrode, may be disposed to be spaced apart from each other along a first direction perpendicular to a thickness direction of the transparent resin layer, and may extend along a second direction perpendicular to the thickness direction and the first direction.

Each of the plurality of accommodating units may include a lower surface facing the first electrode, an upper surface facing the lower surface, and a connection unit connecting the lower surface and the upper surface.

The upper surface may be spaced apart from the second electrode and a distance from the upper surface to the second electrode may be 5 µm to 20 µm.

A distance from the lower surface to the upper surface may be 70 µm to 160 µm.

A width of the lower surface may be 5 µm to 30 µm and a width of the upper surface may be 1 µm to 15 µm and the width of the lower surface may be larger than the width of the upper surface.

A distance between lower surfaces of adjacent accommodating units may be 15 µm to 50 µm and a distance between upper surfaces of adjacent accommodating units may be 25 µm to 60 µm.

The connection unit may include a first connection unit which connects one end of the lower surface and one end of the upper surface and a second connection unit which connects the other end of the lower surface and the other end of the upper surface and an angle formed by the first connection unit and the lower surface may be different from an angle formed by the second connection unit and the lower surface.

The angle formed by the first connection unit and the lower surface may be 96° to 105° and the angle formed by the second connection unit and the lower surface may be 90° to 95°.

Each of the first electrode and the second electrode may be patterned so as to correspond to each of the plurality of accommodating units.

The first base member and the second base member may be independently formed by one or more materials selected from cycloolefin polymer, cycloolefin copolymer, triacetyl cellulose, polycarbonate, polyethylene terephthalate, and polyimide.

The hollow carbon black may include a hollow portion and a shell which encloses the hollow portion and includes carbon black.

A volume fraction of the hollow portion may be 50 vol. % to 90 vol. %.

A density of the charged hollow carbon black may be 0.60 g/cm$^3$ to 0.90 g/cm$^3$.

A BET surface area of the charged hollow carbon black may be 500 m$^2$/g to 1500 m$^2$/g.

An average particle size of the charged hollow carbon black may be 100 nm to 500 nm.

The ink may further include polyisobutylene succinimide amine as a dispersant.

When a voltage is not applied to the first electrode and the second electrode, the charged hollow carbon black may be present to be uniformly dispersed inside each of the plurality of accommodating units and the viewing angle controlling film may operate in a narrow viewing angle mode and when a voltage is applied to the first electrode and the second electrode, the charged hollow carbon black may be aggregated toward the upper surface of the plurality of accommodating units and the viewing angle controlling film may operate in a wide viewing angle mode.

According to another aspect of the present disclosure, a display device comprise a display panel; and a viewing angle controlling film which is disposed above or below the display panel, wherein the viewing angle controlling film is that the above mentioned.

The display panel may be a liquid crystal display panel and may further include a backlight unit disposed below the display panel, and the viewing angle controlling film may be disposed between the liquid crystal display panel and the backlight unit.

The display panel may be an organic light emitting display panel and the viewing angle controlling film may be disposed above the organic light emitting display panel.

Although the exemplary aspects of the present disclosure have been described in detail with reference to the accompanying drawings, the present disclosure is not limited thereto and may be embodied in many different forms without departing from the technical concept of the present disclosure. Therefore, the exemplary aspects of the present disclosure are provided for illustrative purposes only but not intended to limit the technical concept of the present disclosure. The scope of the technical concept of the present disclosure is not limited thereto. Therefore, it should be understood that the above-described exemplary aspects are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A viewing angle controlling film, comprising:
   a first base material;
   a first electrode disposed on the first base material;
   a transparent resin layer disposed on the first electrode and having a plurality of accommodating units;
   a second electrode disposed on the transparent resin layer;
   a second base material disposed on the second electrode;
   an ink including a charged hollow carbon black particle and a solvent accommodated in each of the plurality of accommodating units, and
   an average particle size of the charged hollow carbon black particle is 140 nm to 250 nm.

2. The viewing angle controlling film according to claim 1, wherein each of the plurality of accommodating units faces the second electrode, is spaced apart from each other along a first direction perpendicular to a thickness direction of the transparent resin layer, and extends along a second direction perpendicular to the thickness direction and the first direction.

3. The viewing angle controlling film according to claim 1, wherein each of the plurality of accommodating units includes a lower surface facing the first electrode, an upper surface facing the lower surface, and a connection unit connecting the lower surface and the upper surface.

4. The viewing angle controlling film according to claim 3, wherein the upper surface is spaced apart from the second electrode and a distance from the upper surface to the second electrode is 5 μm to 20 μm.

5. The viewing angle controlling film according to claim 3, wherein a distance from the lower surface to the upper surface is 70 μm to 160 μm.

6. The viewing angle controlling film according to claim 3, wherein a width of the lower surface is 5 μm to 30 μm and a width of the upper surface is 1 μm to 15 μm and the width of the lower surface is larger than the width of the upper surface.

7. The viewing angle controlling film according to claim 3, wherein a distance between lower surfaces of adjacent accommodating units is 15 μm to 50 μm and a distance between upper surfaces of adjacent accommodating units is 25 μm to 60 μm.

8. The viewing angle controlling film according to claim 3, wherein the connection unit includes a first connection unit which connects one end of the lower surface and one end of the upper surface and a second connection unit which connects another end of the lower surface and another end of the upper surface and an angle formed by the first connection unit and the lower surface is different from an angle formed by the second connection unit and the lower surface.

9. The viewing angle controlling film according to claim 8, wherein the angle formed by the first connection unit and the lower surface is 96° to 105° and the angle formed by the second connection unit and the lower surface is 90° to 95°.

10. The viewing angle controlling film according to claim 3, wherein when a voltage is not applied to the first electrode and the second electrode, the charged hollow carbon black particle is present to be uniformly dispersed inside each of the plurality of accommodating units and the viewing angle controlling film operates in a narrow viewing angle mode and when a voltage is applied to the first electrode and the second electrode, the charged hollow carbon black particle is aggregated toward the upper surface of the plurality of accommodating units and the viewing angle controlling film operates in a wide viewing angle mode.

11. The viewing angle controlling film according to claim 1, wherein each of the first electrode and the second electrode is patterned to correspond to each of the plurality of accommodating units.

12. The viewing angle controlling film according to claim 1, wherein the first base material and the second base material are independently formed by at least one of cycloolefin polymer, cycloolefin copolymer, triacetyl cellulose, polycarbonate, polyethylene terephthalate, and polyimide.

13. The viewing angle controlling film according to claim 1, wherein the hollow carbon black particle includes a hollow portion and a shell which encloses the hollow portion and includes carbon black.

14. The viewing angle controlling film according to claim 13, wherein a volume fraction of the hollow portion is 50 vol. % to 90 vol. %.

15. The viewing angle controlling film according to claim 1, wherein a density of the charged hollow carbon black particle is 0.60 g/cm$^3$ to 0.90 g/cm$^3$.

16. The viewing angle controlling film according to claim 1, wherein a BET surface area of the charged hollow carbon black particle is 500 m$^2$/g to 1500 m$^2$/g.

17. The viewing angle controlling film according to claim 1, wherein the ink further includes polyisobutylene succinimide amine as a dispersant.

18. A display device, comprising:
a display panel;
a viewing angle controlling film which is disposed above or below the display panel,
wherein the viewing angle controlling film includes:
a first base material;
a first electrode disposed on the first base material;
a transparent resin layer disposed on the first electrode and having a plurality of accommodating units;
a second electrode disposed on the transparent resin layer;
a second base material disposed on the second electrode; and
an ink including a charged hollow carbon black particle and a solvent accommodated in each of the plurality of accommodating units, and
an average particle size of the charged hollow carbon black particle is 140 nm to 250 nm.

19. The display device according to claim 18, wherein the display panel is a liquid crystal display panel and further includes a backlight unit disposed below the display panel, and the viewing angle controlling film is disposed between the liquid crystal display panel and the backlight unit.

20. The display device according to claim 18, wherein the display panel is an organic light emitting display panel and the viewing angle controlling film is disposed above the organic light emitting display panel.

* * * * *